United States Patent
Shibata et al.

(10) Patent No.: US 12,099,939 B2
(45) Date of Patent: Sep. 24, 2024

(54) SIGNAL DISPLAY CONTROL DEVICE AND COMPUTER READABLE MEDIUM

(71) Applicant: Mitsubishi Electric Corporation, Tokyo (JP)

(72) Inventors: Masahiko Shibata, Tokyo (JP); Satoshi Mii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 892 days.

(21) Appl. No.: 17/152,469

(22) Filed: Jan. 19, 2021

(65) Prior Publication Data

US 2021/0142201 A1    May 13, 2021

Related U.S. Application Data

(63) Continuation of application No. PCT/JP2018/032612, filed on Sep. 3, 2018.

(51) Int. Cl.
*G06N 7/01* (2023.01)
*G06T 1/20* (2006.01)

(52) U.S. Cl.
CPC ........ *G06N 7/01* (2023.01); *G06T 1/20* (2013.01)

(58) Field of Classification Search
CPC .................................. G06N 7/01; G06T 1/20
USPC ................................................................ 703/2
See application file for complete search history.

(56) References Cited

U.S. PATENT DOCUMENTS

| | | | |
|---|---|---|---|
| 5,570,300 A | 10/1996 | Henry et al. | |
| 5,774,378 A | 6/1998 | Yang | |
| 6,477,485 B1 | 11/2002 | Radulovic et al. | |
| 2006/0073013 A1 | 4/2006 | Emigholz et al. | |
| 2007/0021890 A1* | 1/2007 | Ide | G05B 23/024 701/44 |
| 2007/0168068 A1 | 7/2007 | Saito | |
| 2013/0030555 A1 | 1/2013 | Starr et al. | |
| 2013/0097128 A1 | 4/2013 | Suzuki et al. | |
| 2014/0279795 A1 | 9/2014 | Shibuya et al. | |
| 2016/0005298 A1 | 1/2016 | Takahashi et al. | |
| 2016/0033953 A1 | 2/2016 | Nakagawa | |
| 2016/0076970 A1 | 3/2016 | Takahashi | |

(Continued)

FOREIGN PATENT DOCUMENTS

| | | |
|---|---|---|
| CN | 102859457 A | 1/2013 |
| CN | 105103064 A | 11/2015 |

(Continued)

OTHER PUBLICATIONS

Tektronix_2009 (Digital Debug with Oscilloscopes Lab Experiment 2009). (Year: 2009).*

(Continued)

*Primary Examiner* — Brian S Cook
(74) *Attorney, Agent, or Firm* — Birch, Stewart, Kolasch & Birch, LLP

(57) ABSTRACT

An acceptance unit (111) accepts an observation signal representing an observation value at each time point. A probability calculation unit (112) calculates a probability that a normal observation signal represents a reference value at each time point. A graph display control unit (113) displays a signal graph expressing the accepted observation signal in time series, and a probability graph expressing a calculated probability in time series, on a common time axis.

10 Claims, 18 Drawing Sheets

(56) References Cited

U.S. PATENT DOCUMENTS

| | | |
|---|---|---|
| 2016/0287184 A1 | 10/2016 | Diebold et al. |
| 2017/0031329 A1 | 2/2017 | Inagaki et al. |
| 2018/0017961 A1 | 1/2018 | Bense et al. |
| 2018/0231969 A1 | 8/2018 | Noda |
| 2019/0265657 A1 | 8/2019 | Inagaki et al. |
| 2019/0376840 A1 | 12/2019 | Koizumi et al. |

FOREIGN PATENT DOCUMENTS

| | | | |
|---|---|---|---|
| CN | 105787587 | A | 7/2016 |
| DE | 112013006837 | T5 | 12/2015 |
| JP | 4-140803 | A | 5/1992 |
| JP | 6-109498 | A | 4/1994 |
| JP | 9-280900 | A | 10/1997 |
| JP | 2000-29513 | A | 1/2000 |
| JP | 2002-215231 | A | 7/2002 |
| JP | 3425148 | B2 | 7/2003 |
| JP | 2005-115426 | A | 4/2005 |
| JP | 2005-128721 | A | 5/2005 |
| JP | 2005-301582 | A | 10/2005 |
| JP | 2005-346655 | A | 12/2005 |
| JP | 2006-343063 | A | 12/2006 |
| JP | 2007-102388 | A | 4/2007 |
| JP | 2007-102561 | A | 4/2007 |
| JP | 2008-512800 | A | 4/2008 |
| JP | 2008-226066 | A | 9/2008 |
| JP | 2009-223416 | A | 10/2009 |
| JP | 2012-48405 | A | 3/2012 |
| JP | 2013-25367 | A | 2/2013 |
| JP | 2013-33459 | A | 2/2013 |
| JP | 2013033459 | A * | 2/2013 |
| JP | 2013-89184 | A | 5/2013 |
| JP | 2014-507721 | A | 3/2014 |
| JP | 2015-32152 | A | 2/2015 |
| JP | 2015-162140 | A | 9/2015 |
| JP | 2015-197917 | A | 11/2015 |
| JP | 2016-164772 | A | 9/2016 |
| JP | 2017-33526 | A | 2/2017 |
| KR | 10-1659989 | B1 | 9/2016 |
| TW | I569231 | B | 2/2017 |
| TW | 201725347 | A | 7/2017 |
| WO | WO 2005/091098 | A1 | 9/2005 |
| WO | WO 2011/135606 | A1 | 11/2011 |
| WO | WO 2013/011745 | A1 | 1/2013 |
| WO | WO 2014/167726 | A1 | 10/2014 |
| WO | WO2018/150616 | A1 | 8/2018 |

OTHER PUBLICATIONS

EE121_2002 (Laboratory Assignment #2 Digital Design Laboratory 2002). (Year: 2002).*
Stack_Overflow_2011 (Plot a line chart with conditional colors depending on values, 2011). (Year: 2011).*
German Office Action for German Application No. 112017008197.1, dated Feb. 24, 2021, with English translation.
German Office Action for German Application No. 112018007863.9, dated Mar. 22, 2021, with English translation.
Chinese Office Action, dated Apr. 7, 2022, for Chinese Application No. 201880096843.2, with an English translation.
Indian Office Action for Indian Application No. 202147007501, dated Feb. 22, 2022, with English translation.
Kelly et al., "A Steady-State Detection (SSD) Algorithm to Detect Non-Stationary Drifts in Processes," BYU ScholarsArchive Faculty Publications, 2013, 14 pages total, URL: https://apm.byu.edu/prism/uploads/Members/kelly_jpc2013.pdf.
U.S. Office Action for U.S. Appl. No. 16/856,755, dated Sep. 7, 2021.
Indian Office Action for Indian Application No. 202047019865, dated Aug. 5, 2021, with English translation.
Chinese Office Action and Search Report for Chinese Application No. 201780092426.6, dated Apr. 8, 2022, with English translation.
U.S. Office Action for U.S. Appl. No. 16/621,196, dated Apr. 29, 2022.
U.S. Appl. No. 16/621,196, filed Dec. 10, 2019.
U.S. Appl. No. 16/856,755, filed Apr. 23, 2020.
Chinese Office Action for Chinese Application No. 201880096843.2, dated Aug. 2, 2022, with an English translation.
German Office Action for German Application No. 112018007863.9, dated Sep. 17, 2021, with an English translation.
English translation of the International Search Report, dated Mar. 6, 2018, for International Application No. PCT/JP2017/045287.
English translation of the International Search Report, dated Sep. 26, 2017, for International Application No. PCT/JP2017/024075.
German Office Action, dated Oct. 8, 2020, for German Application No. 112017007606.4, with an English translation.
International Search Report, dated Nov. 6, 2018, for International Application No. PCT/JP2018/032612, with an English translation.
Japanese Notice of Reasons for Refusal, dated Nov. 24, 2020, for Japanese Application No. 2020-540883, with an English translation.
Korean Office Action, dated Jun. 3, 2020, for, Korean Application No. 10-2019-7037657, with an English translation.
Korean Office Action, dated Mar. 5, 2020, for Korean Application No. 10-2019-7037657, with an English translation.
Shibata et al.. "Anomaly Detection Method for Digital Control Input-Output Signals", Proceedings of the 80th National Convention of IPSJ: Computer Systems, Software Science/Engineering, Data and Web, Mar. 22, 2018, pp. 1-157 and 1-158 (total 5 pages), with an English translation.
Taiwanese Examination Opinion Notice and Search Report, dated Jan. 23, 2019, for Taiwanese Application No. 106130970, with an English translation of the Taiwanese Examination Opinion Notice.
Taiwanese Office Action and Search Report, dated Jan. 15, 2021, for Taiwanese Application No. 108105574, with an English machine translation of the Taiwanese Office Action.
Taiwanese Office Action and Search Report, dated Mar. 7, 2019, for Taiwanese Application No. 107110692, with an English machine translation of the Taiwanese Office Action.
Taiwanese Office Action, dated Nov. 6, 2019, for Taiwanese Application No. 107110692, with an English machine translation.
US Office Action for U.S. Appl. No. 16/856,755 dated May 19, 2021.
Indian Office Action for Indian Application No. 201947050929, dated Mar. 4, 2021. with English translation.
Indian Office Action for Indian Application No. 201947050929, dated Jun. 28, 2023 with an English translation.
Chinese Office Action for Chinese Application No. 201780092426.6, dated Sep. 5, 2022, with English translation.
Chinese Office Action and Search Report for Chinese Application No. 201780097693.2, dated Nov. 9, 2023, with an English translation.

* cited by examiner

SIGNAL DISPLAY CONTROL DEVICE AND COMPUTER READABLE MEDIUM

CROSS REFERENCE TO RELATED APPLICATION

This application is a Continuation of PCT International Application No. PCT/JP2018/032612, filed on Sep. 3, 2018, which is hereby expressly incorporated by reference into the present application.

TECHNICAL FIELD

The present invention relates to a technique of displaying a signal such that whether the signal is abnormal or normal can be determined easily.

BACKGROUND ART

A technique has been proposed which displays a signal value such as temperature, pressure, and current; average behavior of the signal value; and an outlier degree of the signal value simultaneously.

Patent Literature 1 discloses display of an index (T2 statistic quantity) expressing average behavior of torque current and an index (Q statistic quantity) expressing an outlier degree.

CITATION LIST

Patent Literature

Patent Literature 1: JP 2013-033459 A

SUMMARY OF INVENTION

Technical Problem

In the prior art, a signal to be displayed is an analog signal.

The prior art does not disclose a technique for displaying a signal such that whether a binary signal is abnormal or normal can be determined easily.

A binary signal is a signal that indicates one or the other of 0 and 1. Therefore, it is difficult to display average behavior of the binary signal and an outlier degree of the binary signal. Further, even if the average behavior of the binary signal and the outlier degree of the binary signal are displayed, it is difficult to determine whether the binary signal is abnormal or normal.

An objective of the present invention is to make it easy to determine whether a signal is abnormal or normal even if the signal to be displayed is a binary signal.

Solution to Problem

A signal display control device of the present invention includes:

a signal acceptance unit to accept an observation signal representing an observation value at each time point;

a probability calculation unit to calculate a probability that a normal observation signal represents a reference value at each time point; and a graph display control unit to display a signal graph indicating the accepted observation signal in time series, and a probability graph expressing the calculated probability in time series, on a common time axis.

Advantageous Effects of Invention

According to the present invention, a probability graph is displayed together with a signal graph. Therefore, even if a signal (observation signal) to be displayed is a binary signal, whether the signal is abnormal or normal can be determined easily by referring to the probability graph.

DESCRIPTION OF EMBODIMENTS

Figure 1:
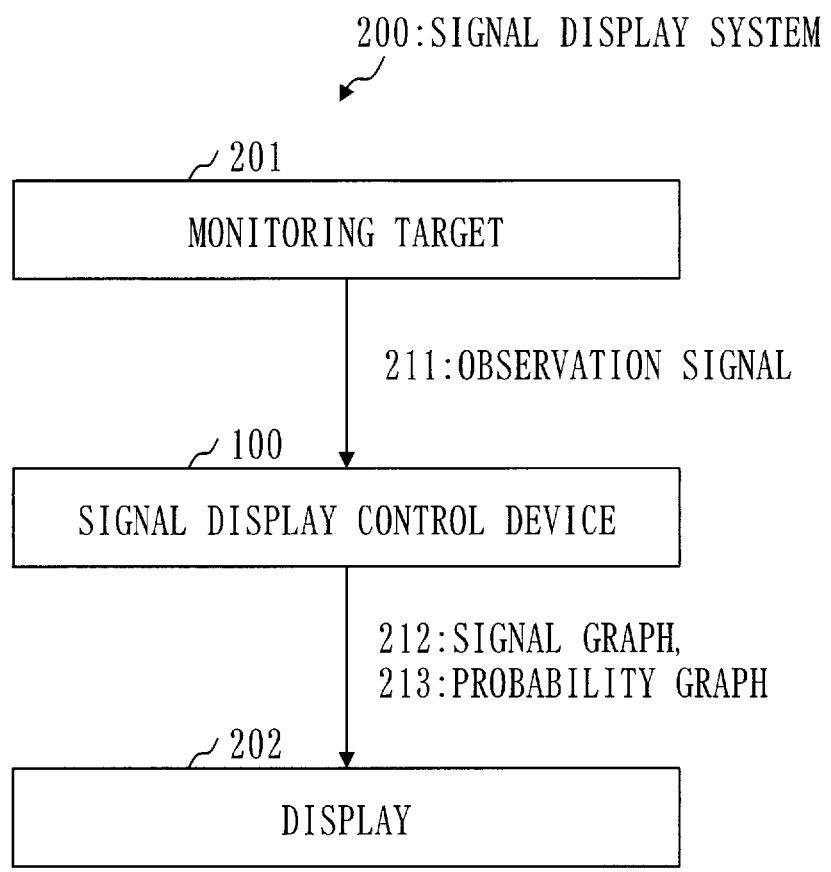
FIG. 1 is a configuration diagram of a signal display system 200 in Embodiment 1.

In the embodiments and drawings, the same or equivalent element is denoted by the same reference sign. Description of an element denoted by the same reference sign as that of a described element will be appropriately omitted or simplified. Arrows in the drawings mainly illustrate data flows or processing flows.

Embodiment 1

A mode in which a probability graph corresponding to a signal graph is displayed will be described with referring to FIGS. 1 to 12.

*Description of Configurations*

A configuration of a signal display system 200 will be described with referring to FIG. 1.

The signal display system 200 is provided with a signal display control device 100, a monitoring target 201, and a display 202.

The monitoring target 201 is a target that is monitored for its observation value such as a temperature, a pressure, and a current. An observation signal 211 is outputted from the monitoring target 201 and inputted to the signal display control device 100.

The observation signal 211 is a signal representing the observation value measured in the monitoring target 201.

For example, the monitoring target 201 is equipment provided with various sensors. The observation signal 211 is a signal outputted from the various sensors.

The signal display control device 100 accepts the observation signal 211 and displays a signal graph 212 and a probability graph 213 to the display 202.

The signal graph 212 is a graph expressing the observation signal 211 in time series.

The probability graph 213 is a graph expressing in time series a probability that a normal observation signal represents a reference value.

A configuration of the signal display control device 100 will be described with referring to FIG. 2.

The signal display control device 100 is a computer provided with hardware devices such as a processor 101, a memory 102, an auxiliary storage device 103, and an input/output interface 104. These hardware devices are connected to each other via signal lines.

The processor 101 is an Integrated Circuit (IC) to perform computation processing, and controls other hardware devices. For example, the processor 101 is a Central Processing Unit (CPU), a Digital Signal Processor (DSP), or a Graphics Processing Unit (GPU).

The memory 102 is a volatile storage device. The memory 102 is also called a main storage device or a main memory. For example, the memory 102 is a Random Access Memory (RAM). Data stored in the memory 102 is saved in the auxiliary storage device 103 as necessary.

The auxiliary storage device 103 is a nonvolatile storage device. For example, the auxiliary storage device 103 is a Read-Only Memory (ROM), a Hard Disk Drive (HDD), or a flash memory. Data stored in the auxiliary storage device 103 is loaded by the memory 102 as necessary.

The input/output interface 104 is a port to which an input device and an output device are connected. For example, the input/output interface 104 is a USB terminal, the input device is composed of a keyboard, a mouse, and a receiver, and the output device is composed of the display 202 and a transmitter. Note that USB stands for Universal Serial Bus.

The signal display control device 100 is provided with elements such as an acceptance unit 111, a probability calculation unit 112, and a graph display control unit 113. These elements are implemented by software.

In the auxiliary storage device 103, a signal display control program is stored which causes the computer to function as the acceptance unit 111, the probability calculation unit 112, and the graph display control unit 113. The signal display control program is loaded by the memory 102 and executed by the processor 101.

Furthermore, an Operating System (OS) is stored in the auxiliary storage device 103. At least part of the OS is loaded by the memory 102 and executed by the processor 101.

That is, the processor 101 executes the signal display control program while executing the OS.

Data obtained by executing the signal display control program is stored in a storage device such as the memory 102, the auxiliary storage device 103, a register in the processor 101, and a cache memory in the processor 101.

The auxiliary storage device 103 functions as a storage unit 120. Alternatively, another storage device may function as the storage unit 120 in place of the auxiliary storage device 103 or along with the auxiliary storage device 103.

The signal display control device 100 may be provided with a plurality of processors that substitute for the processor 101. The plurality of processors share a role of the processor 101.

The signal display control program can be computer readably recorded (stored) in a nonvolatile recording medium such as an optical disk and a flash memory.

*Description of Operations*

Operations of the signal display control device 100 correspond to a signal display control method. A procedure of the signal display control method corresponds to a procedure of the signal display control program.

Figure 3:
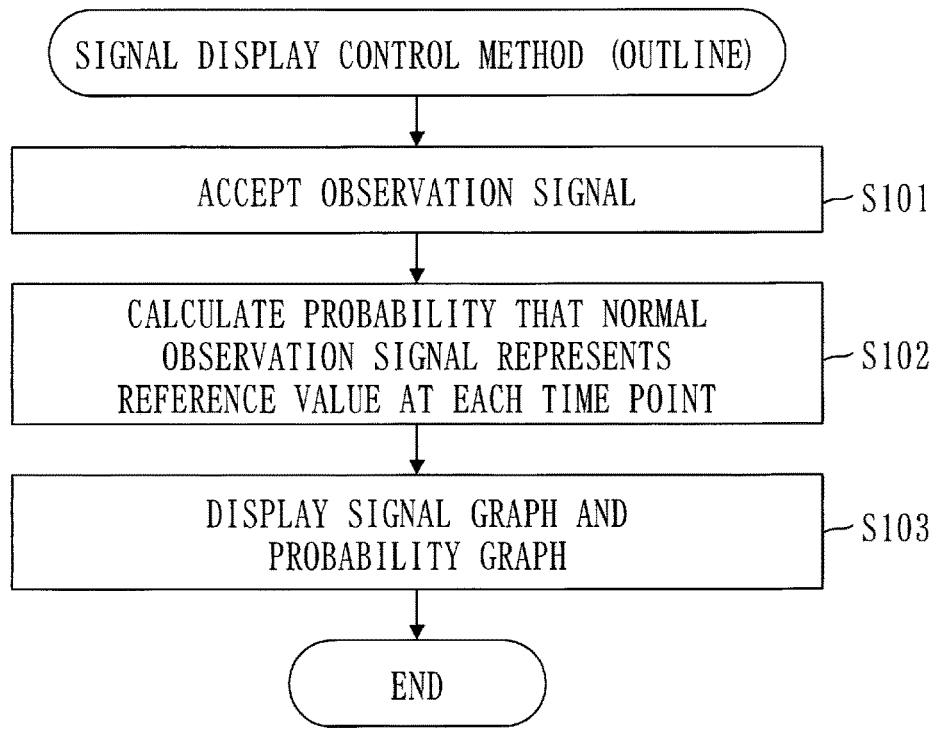
FIG. 3 is a flowchart of a signal display control method (outline) in Embodiment 1.

An outline of the signal display control method will be described with referring to FIG. 3.

In step S101, the acceptance unit 111 accepts the observation signal 211.

The observation signal 211 represents an observation value at each time point.

In step S102, the probability calculation unit 112 calculates a probability that a normal observation signal represents the reference value at each time point.

In step S103, the graph display control unit 113 displays the signal graph 212 and the probability graph 213 on a common time axis.

The signal graph 212 expresses the accepted observation signal in time series.

The probability graph 213 expresses the calculated probability in time series.

Figure 4:
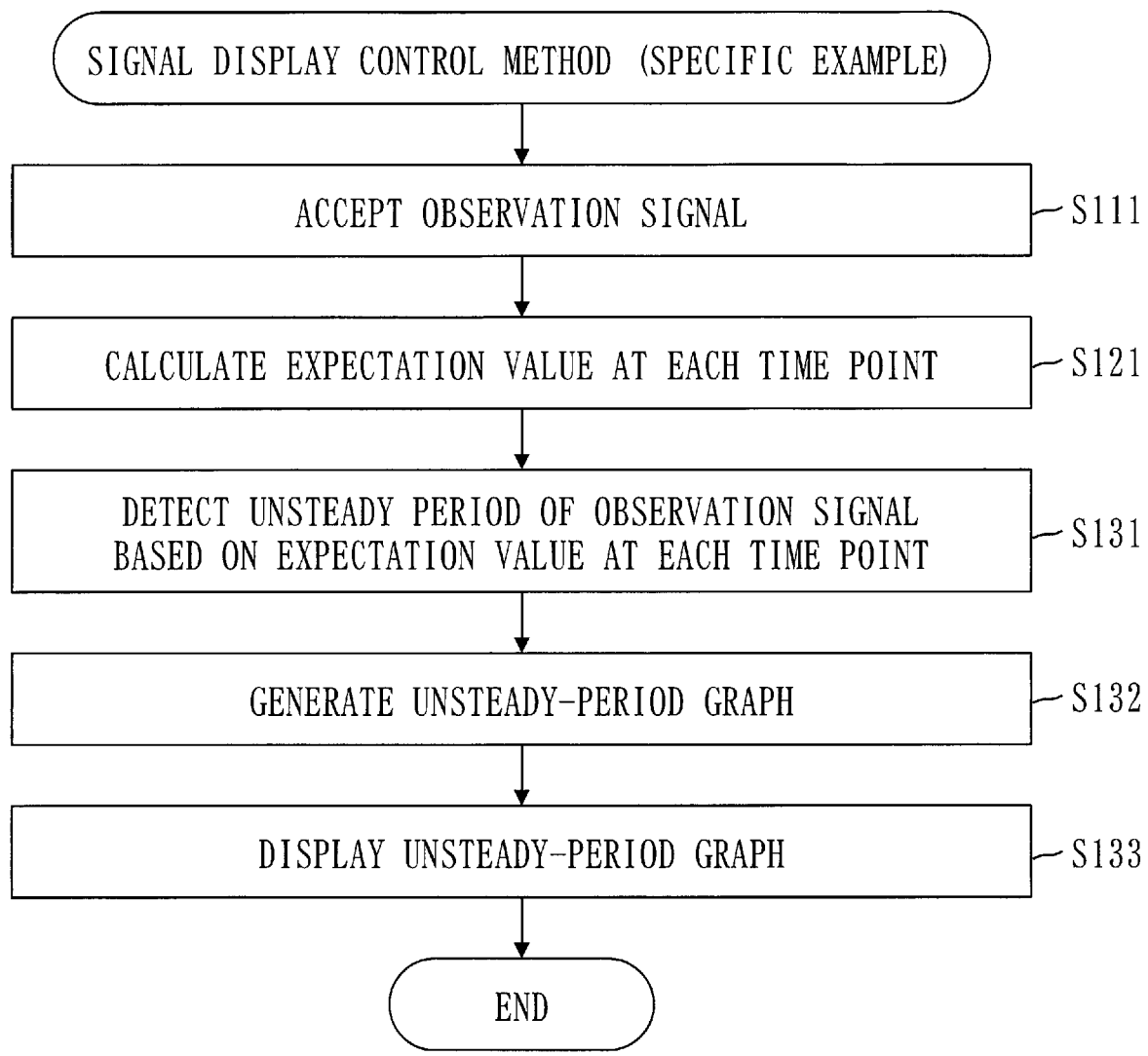
FIG. 4 is a flowchart of the signal display control method (specific example) in Embodiment 1.

A specific example of the signal display control method will be described with referring to FIG. 4.

In step S111, the acceptance unit 111 accepts the observation signal 211.

Specifically, the observation signal 211 is a binary signal. The binary signal represents one or the other of 0 and 1 at each time point.

In step S121, the probability calculation unit 112 calculates an expectation value at each time point.

The expectation value is a probability that the normal observation signal represents the reference value at each time point.

Specifically, the reference value is one or the other of 0 and 1.

For example, the probability calculation unit 112 calculates the expectation value at each time point as follows.

The probability calculation unit 112 generates an expectation value model in advance by machine-learning a pattern of the normal observation signal. The expectation value model is a model for calculating the expectation value. The probability calculation unit 112 stores the generated expectation value model to the storage unit 120. Specific examples of machine learning include Markov model, Time Delay Neural Network, and Recurrent Neural Network.

Then, the probability calculation unit 112 calculates the expectation value at each time point by calculating the expectation value model.

In step S131, the graph display control unit 113 detects an unsteady period of the observation signal 211 based on the expectation value at each time point.

The unsteady period is a period during which the observation signal 211 represents an unsteady value, that is, a period during which the observation signal 211 is in an unsteady state. "Unsteady" means abnormal.

Meanwhile, a period during which the observation signal 211 represents a steady value, that is, a period during which the observation signal 211 is in a steady state, will be referred to as a steady period. "Steady" means an opposite to unsteady, that is, normal, ordinary, or as prescribed.

For example, the graph display control unit 113 detects the unsteady period of the observation signal 211 as follows.

First, the graph display control unit 113 calculates a steady probability at each time point based on the observation value at that each time point and the expectation value at that each time point. The steady probability is a probability that a value of the normal observation signal is 0 at a time point at which the observation value of the observation signal 211 is 0. The steady probability is also a probability that a value of the normal observation signal is 1 at a time point at which an observation value of the observation signal 211 is 1. In a case where the probability that the observation value is 1 is the expectation value, the steady probability at a time point at which the observation value is 1 is equal to the expectation value. Also, the steady probability at a time point at which the observation value is 0 is equal to "1—expectation value". In a case where the probability that the observation value is 0 is the expectation value, the steady probability at a time point at which the observation value is 1 is equal to "1—expectation value". Also, the steady probability at a time point at which the observation value is 0 is equal to the expectation value.

Subsequently, the graph display control unit 113 calculates a negative logarithmic likelihood at each time point based on the steady probability at that each time point. The negative logarithmic likelihood can be expressed as "−log P" where "P" is the steady probability. The negative logarithmic likelihood to be calculated will be referred to as an abnormality degree.

Subsequently, the graph display control unit 113 compares the abnormality degree at each time point with a threshold. A time point at which the abnormality degree exceeds the threshold is the unsteady time point of the observation signal 211.

Then, the graph display control unit 113 detects the unsteady period of the observation signal 211 based on a comparison result at each time point. A period during which the abnormality degree exceeds the threshold is the unsteady period of the observation signal 211.

In step S132, the graph display control unit 113 generates an unsteady-period graph.

The unsteady-period graph is a graph containing the signal graph 212 of the unsteady period and the probability graph 213 of the unsteady period.

Specifically, the graph display control unit 113 generates the unsteady-period graph as follows.

First, the graph display control unit 113 generates the signal graph 212 of the unsteady period based on the observation signal of the unsteady period.

Furthermore, the graph display control unit 113 generates the probability graph 213 of the unsteady period based on the expectation value of the unsteady period at each time point.

Then, the graph display control unit 113 generates a graph in which the signal graph 212 of the unsteady period and the probability graph 213 of the unsteady period are juxtaposed. The graph to be generated is the unsteady-period graph.

In step S133, the graph display control unit 113 displays the unsteady-period graph.

Specifically, the graph display control unit 113 inputs data of the unsteady-period graph to the display 202 so as to display the unsteady-period graph to the display 202.

Figure 5:
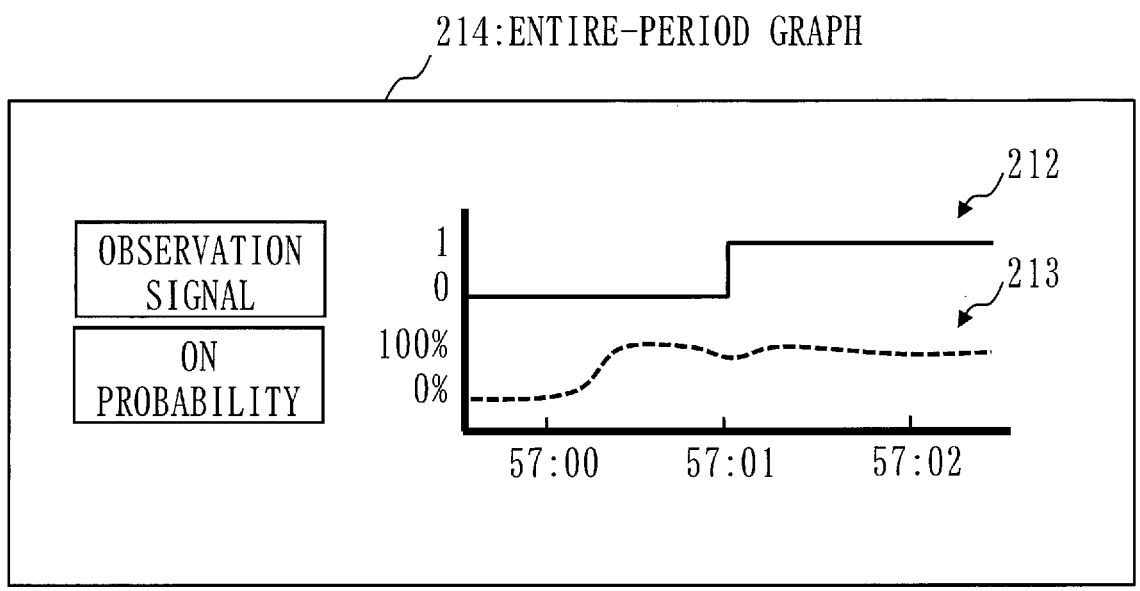
FIG. 5 is a diagram illustrating an entire-period graph 214 in Embodiment 1.

FIG. 5 illustrates an entire-period graph 214.

The entire-period graph 214 is a graph containing the signal graph 212 and the probability graph 213 for the entire period including the steady period and the unsteady period.

In the entire-period graph 214, an axis of abscissa is a time axis that is common to the signal graph 212 and the probability graph 213. The signal graph 212 and the probability graph 213 are juxtaposed with each other. Specifically, the signal graph 212 and the probability graph 213 are placed vertically.

The signal graph 212 expresses the observation signal in time series. The observation signal is a binary signal that represents one or the other of 0 and 1 at each time point.

The probability graph 213 expresses an ON probability at each time point. The ON probability is a probability that the normal observation signal represents 1. In short, the reference value is 1.

An unsteady-period graph 215 will be described with referring to FIG. 6.

The unsteady-period graph 215 is a graph of the unsteady period out of the entire-period graph 214.

In the unsteady-period graph 215, the signal graph 212 shows that the value of the observation signal in the unsteady period is 0 (OFF). Meanwhile, the probability graph 213 shows that the value of the normal observation signal in the unsteady period is likely to be 1 (ON).

\*\*\*Effect of Embodiment 1\*\*\*

In Embodiment 1, the observation signal 211 is a binary signal.

Unlike a multi-value signal that represents one of three values or more at each time point, a binary signal can represent only one or the other of 0 and 1 as the signal value. Therefore, unlike with a multi-value signal, a normal range of a binary signal cannot be expressed by a range of the value. For example, with a multi-value signal, it is possible to calculate an outlier degree based on the signal value (or a prediction value). A prediction value is a signal value that is predicted. With a multi-value signal, by presenting an outlier degree, it is possible to make a user recognize whether the signal value is abnormal or normal. Alternatively, by presenting a multi-value signal, it is also possible to make the user recognize whether the signal value is abnormal or normal. When a multi-value signal is presented, the user recognizes that a signal value obviously higher than neighboring values is abnormal. However, with a binary signal, since its value is 0 or 1, it is difficult to make the user recognize stepwise how a steady value of the binary signal changes.

Meanwhile, in Embodiment 1, a probability value at each time point is presented. A probability value is an interim value between 0 and 1. Hence, it is possible to present, stepwise, prediction of a change in a value of a binary signal. Then, the user can determine easily whether the binary signal is abnormal or normal.

*Other Configurations*

The graph display control unit 113 may generate the entire-period graph 214 in place of the unsteady-period graph 215, and may display the entire-period graph 214. In this case, detection of the unsteady period is unnecessary.

Figure 6:
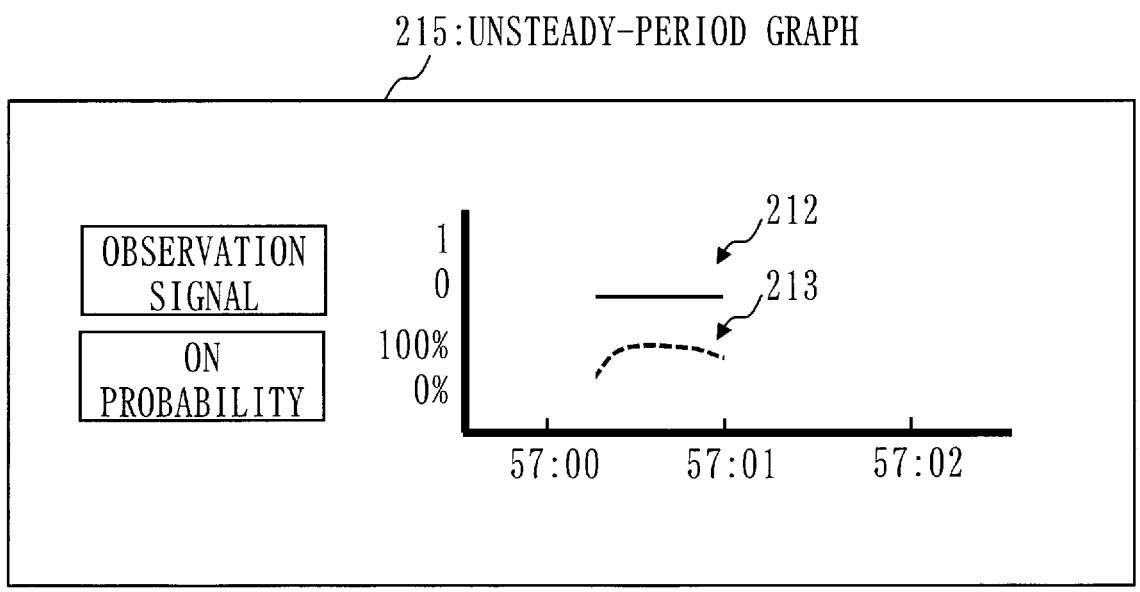
FIG. 6 is a diagram illustrating an unsteady-period graph 215 in Embodiment 1.

In the entire-period graph 214 of FIG. 5 and the unsteady-period graph 215 of FIG. 6, the reference value is 1, and the probability graph 213 expresses an ON probability at each time point.

The reference value may be 0. In this case, the probability graph 213 expresses an OFF probability at each time point. The OFF probability is a probability that the normal observation signal represents 0.

The signal display control device 100 may process a plurality of observation signals 211 in place of one observation signal 211. In this case, the signal display control device 100 accepts a plurality of observation signals 211, calculates an expectation value at each time point per observation signal 211, and displays the signal graph 212 and the probability graph 213 per observation signal 211.

Figure 7:
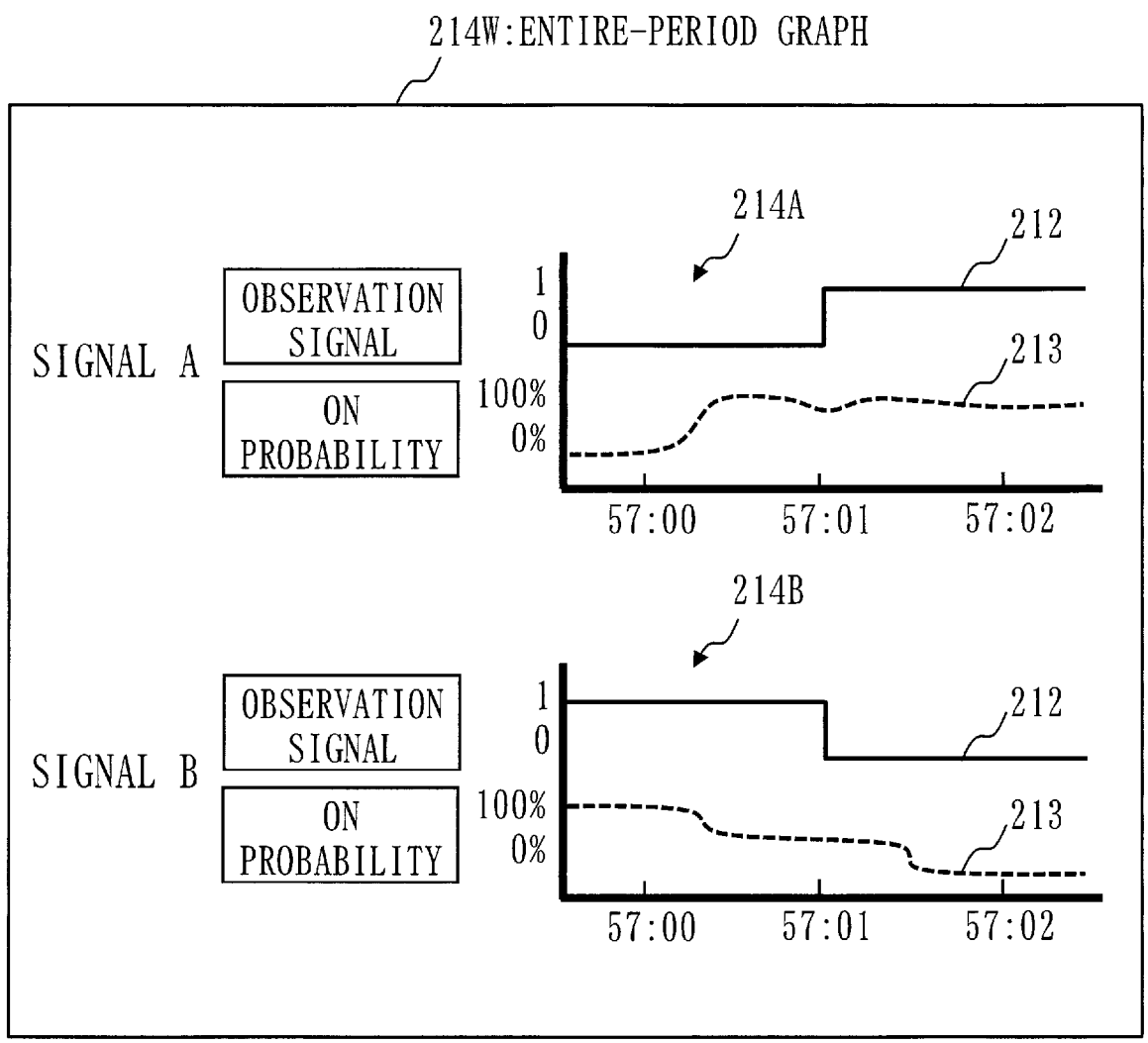
FIG. 7 is a diagram illustrating an entire-period graph 214W in Embodiment 1.

FIG. 7 illustrates an entire-period graph 214W.

The entire-period graph 214W contains an entire-period graph 214A and an entire-period graph 214B.

The entire-period graph 214A is an entire-period graph 214 of a signal A. The entire-period graph 214A contains a signal graph 212 of the signal A and a probability graph 213 of the signal A.

The entire-period graph 214B is an entire-period graph 214 of a signal B. The entire-period graph 214B contains a signal graph 212 of the signal B and a probability graph 213 of the signal B.

Figure 8:
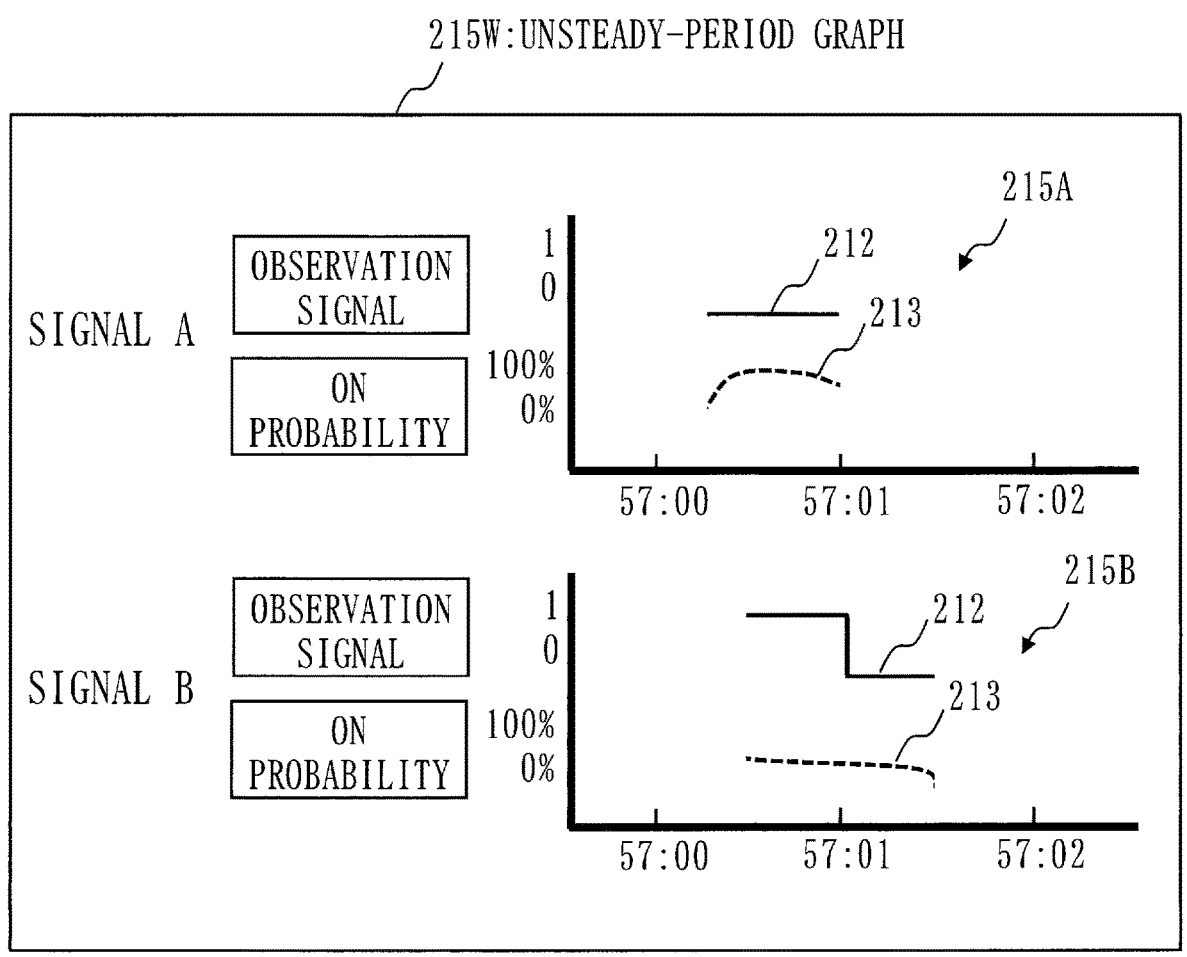
FIG. 8 is a diagram illustrating an unsteady-period graph 215W in Embodiment 1.

FIG. 8 illustrates an unsteady-period graph 215W.

The unsteady-period graph 215W contains an unsteady-period graph 215A and an unsteady-period graph 215B.

The unsteady-period graph 215A is an unsteady-period graph 215 of a signal A. The unsteady-period graph 215A contains a signal graph 212 of the signal A in the unsteady period and a probability graph 213 of the signal A in the unsteady period.

The unsteady-period graph 215B is an unsteady-period graph 215 of the signal B. The unsteady-period graph 215B contains a signal graph 212 of the signal B in the unsteady period and a probability graph 213 of the signal B in the unsteady period.

The graph display control unit 113 may display the signal graph 212 and the probability graph 213 to be superposed on each other within a common display range.

Figure 9:
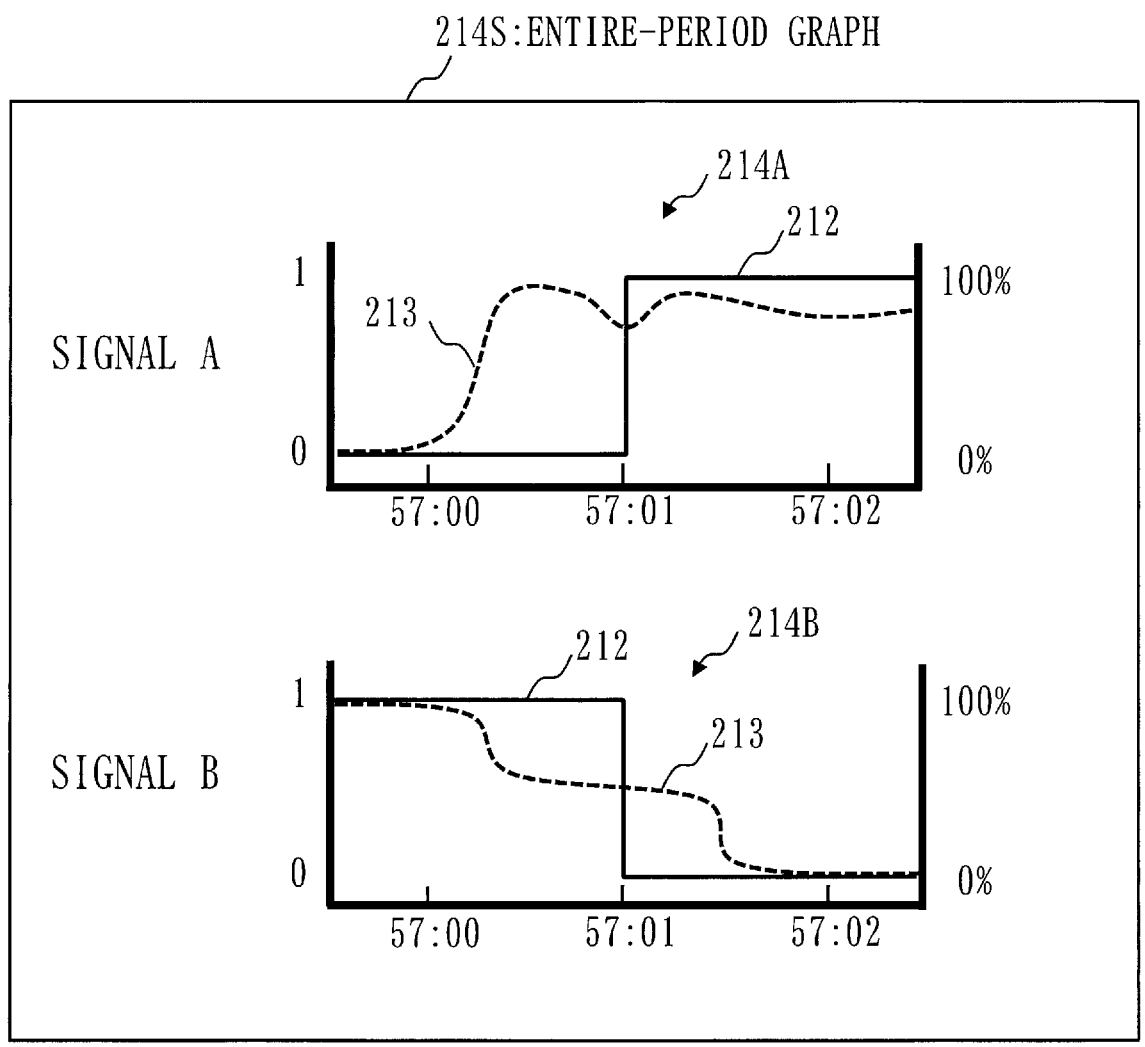
FIG. 9 is a diagram illustrating an entire-period graph 214S in Embodiment 1.

FIG. 9 illustrates an entire-period graph 214S.

The entire-period graph 214S contains an entire-period graph 214A and an entire-period graph 214B.

The entire-period graph 214A is an entire-period graph 214 of a signal A. The entire-period graph 214B is an entire-period graph 214 of a signal B.

In each of the entire-period graph 214A and the entire-period graph 214B, both the signal graph 212 and the probability graph 213 are displayed within a common display range. As a result, the signal graph 212 and the probability graph 213 are superposed on each other.

Figure 10:
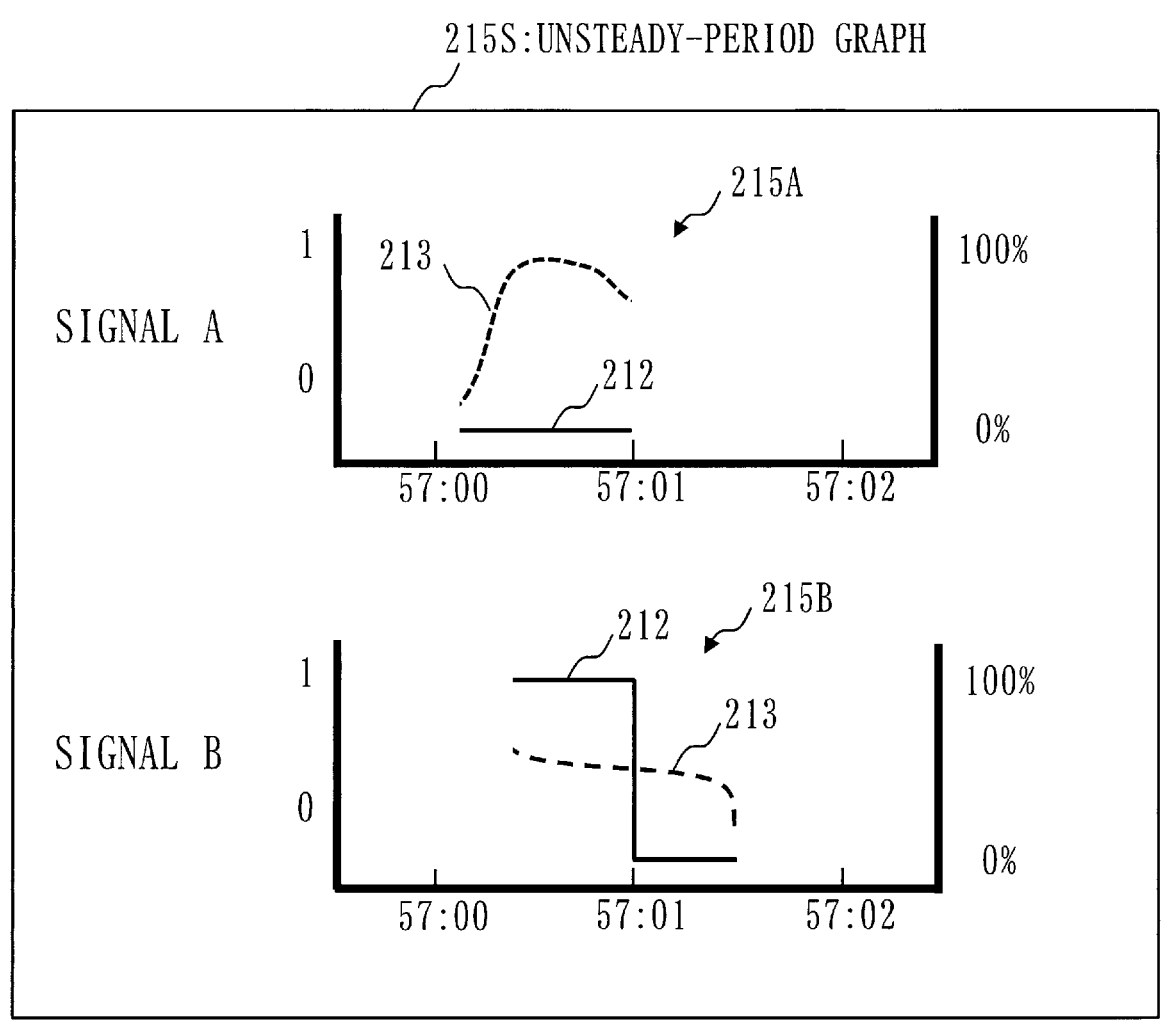
FIG. 10 is a diagram illustrating an unsteady-period graph 215S in Embodiment 1.

FIG. 10 illustrates an unsteady-period graph 215S.

The unsteady-period graph 215S contains an unsteady-period graph 215A and an unsteady-period graph 215B.

The unsteady-period graph 215A is an unsteady-period graph 215 of a signal A. The unsteady-period graph 215B is an unsteady-period graph 215 of a signal B.

In each of the unsteady-period graph 215A and the unsteady-period graph 215B, both the signal graph 212 and the probability graph 213 are displayed within a common display range. As a result, in the unsteady-period graph 215B, the signal graph 212 and the probability graph 213 are superposed on each other.

The graph display control unit 113 may display a coupled graph 216 in place of displaying the signal graph 212 and the probability graph 213 separately.

The coupled graph 216 is a graph in which the signal graph 212 and the probability graph 213 are coupled together. The coupled graph 216 has a line graph expressing observation values at individual time points by a line or a curve. In the line graph, a portion corresponding to each time point is expressed using an appearance corresponding to a probability at that each time point.

Figure 11:
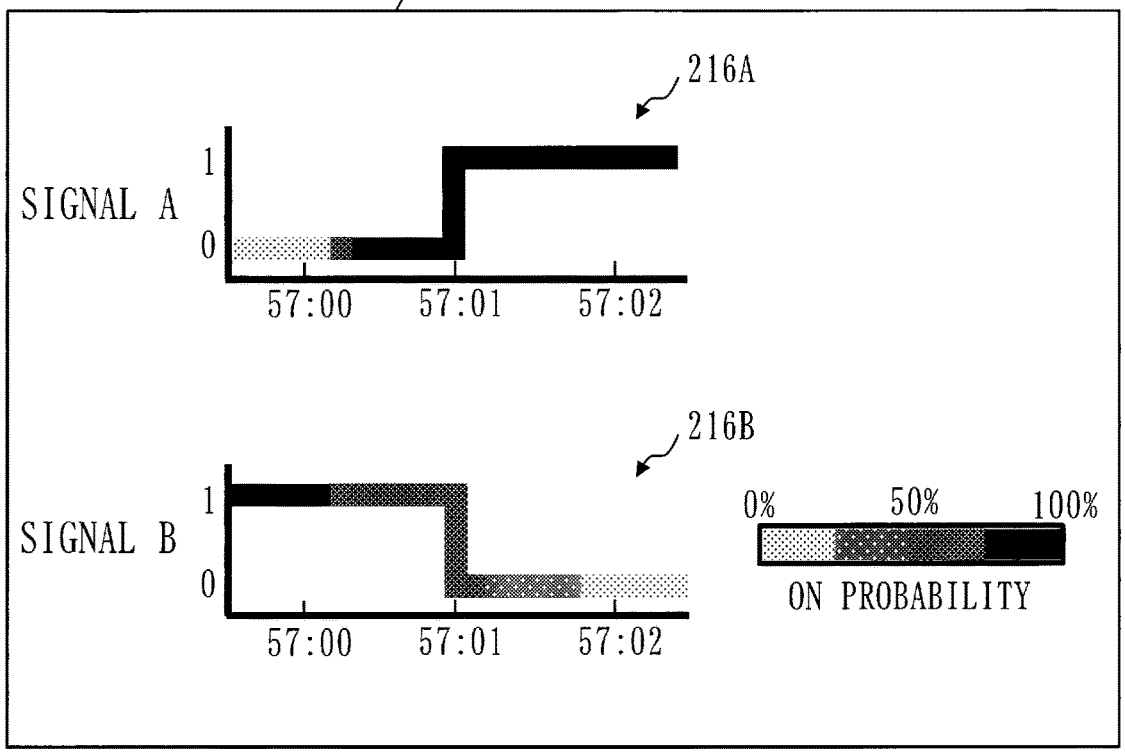
FIG. 11 is a diagram illustrating an entire-period graph 214C in Embodiment 1.

FIG. 11 illustrates an entire-period graph 214C.

The entire-period graph 214C contains a coupled graph 216A and a coupled graph 216B.

The coupled graph 216A is a coupled graph 216 of a signal A. The coupled graph 216B is a coupled graph 216 of a signal B.

Figure 12:
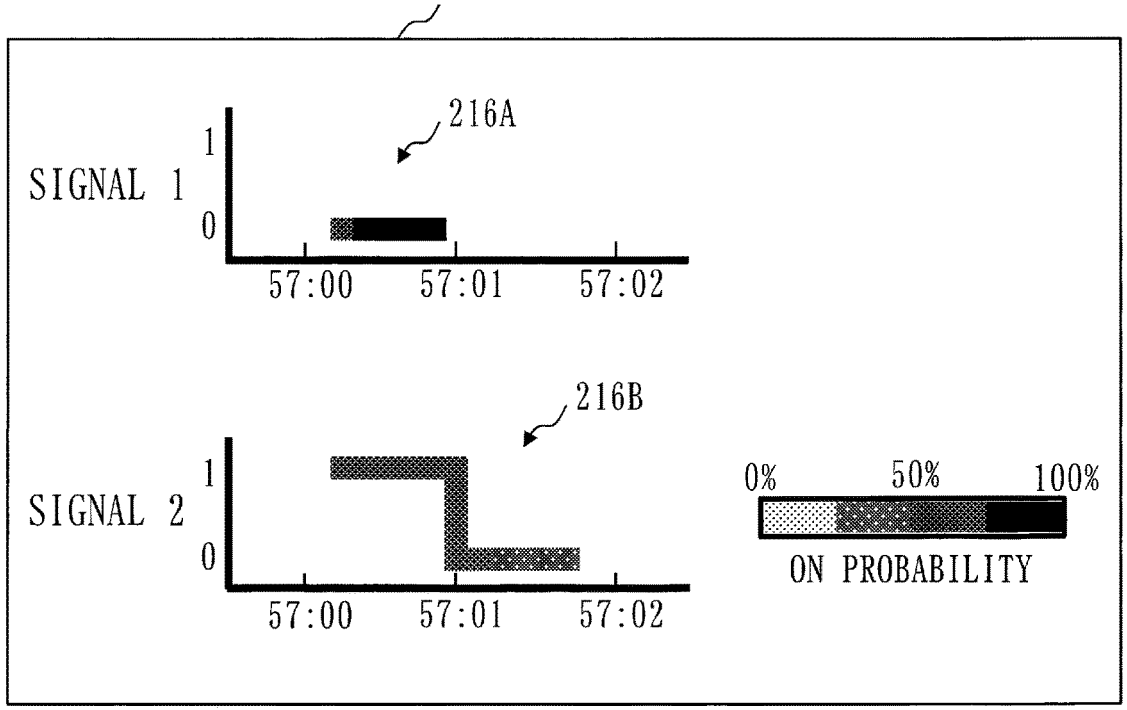
FIG. 12 is a diagram illustrating an unsteady-period graph 215C in Embodiment 1.

FIG. 12 illustrates an unsteady-period graph 215C.

The unsteady-period graph 215C contains a coupled graph 216A and a coupled graph 216B.

The coupled graph 216A is a coupled graph 216 of a signal A in the unsteady period. The coupled graph 216B is a coupled graph 216 of a signal B in the unsteady period.

In the coupled graph 216 of each of FIGS. 11 and 12, observation values (0 or 1) at individual time points are expressed by a line. A portion corresponding to each time point is expressed with a color, a grayscale, a pattern, or the like corresponding to the ON probability at that each time point.

Embodiment 2

Figure 13:
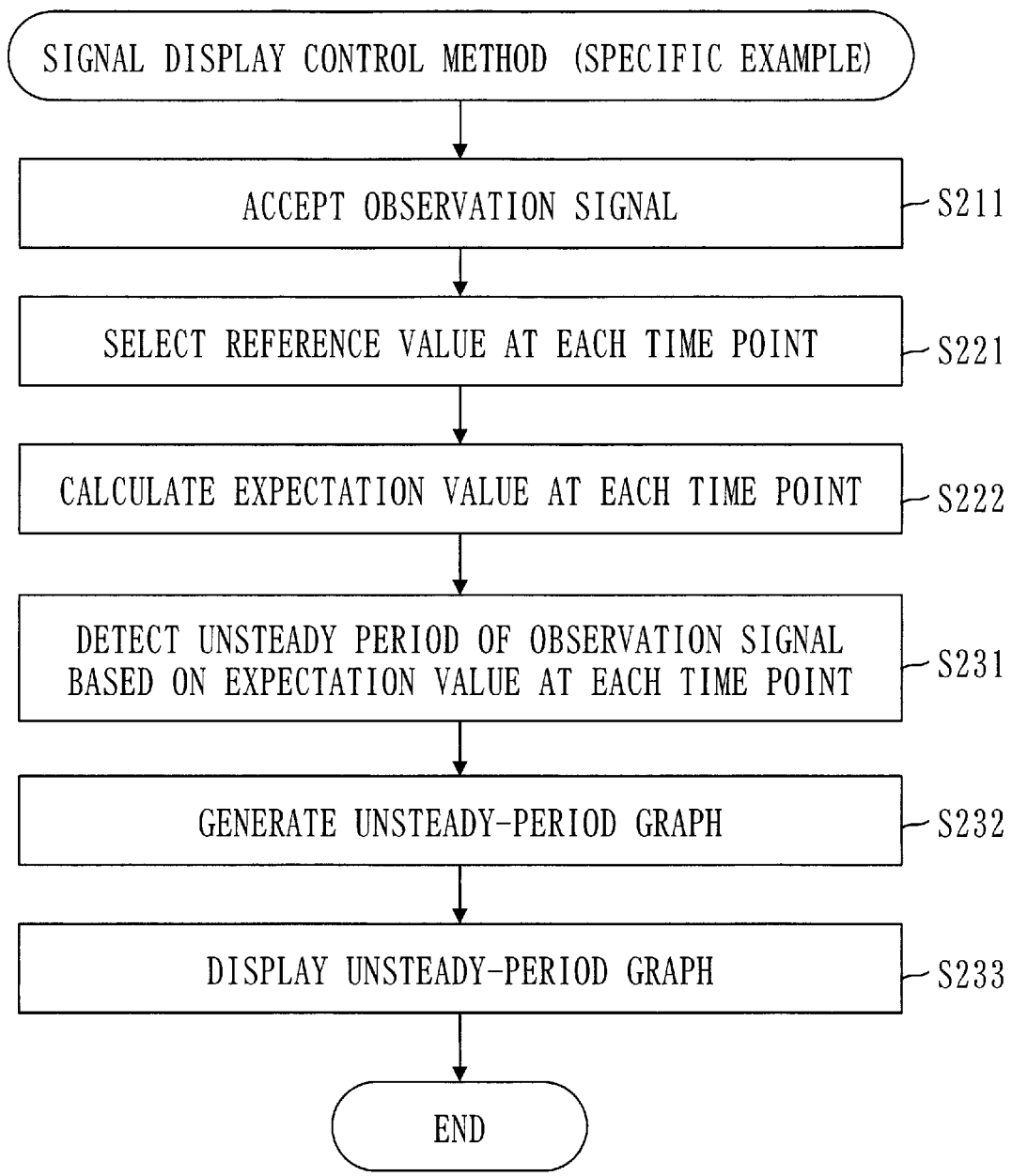
FIG. 13 is a flowchart of a signal display control method (specific example) in Embodiment 2.

A mode in which the reference value is changed according to a value of a binary signal at each time point will be described mainly regarding a difference from Embodiment 1 with referring to FIGS. 13 o 17.

*Description of Configurations*

A configuration of a signal display system 200 is the same as a counterpart configuration in Embodiment 1 (see FIG. 1).

Figure 2:
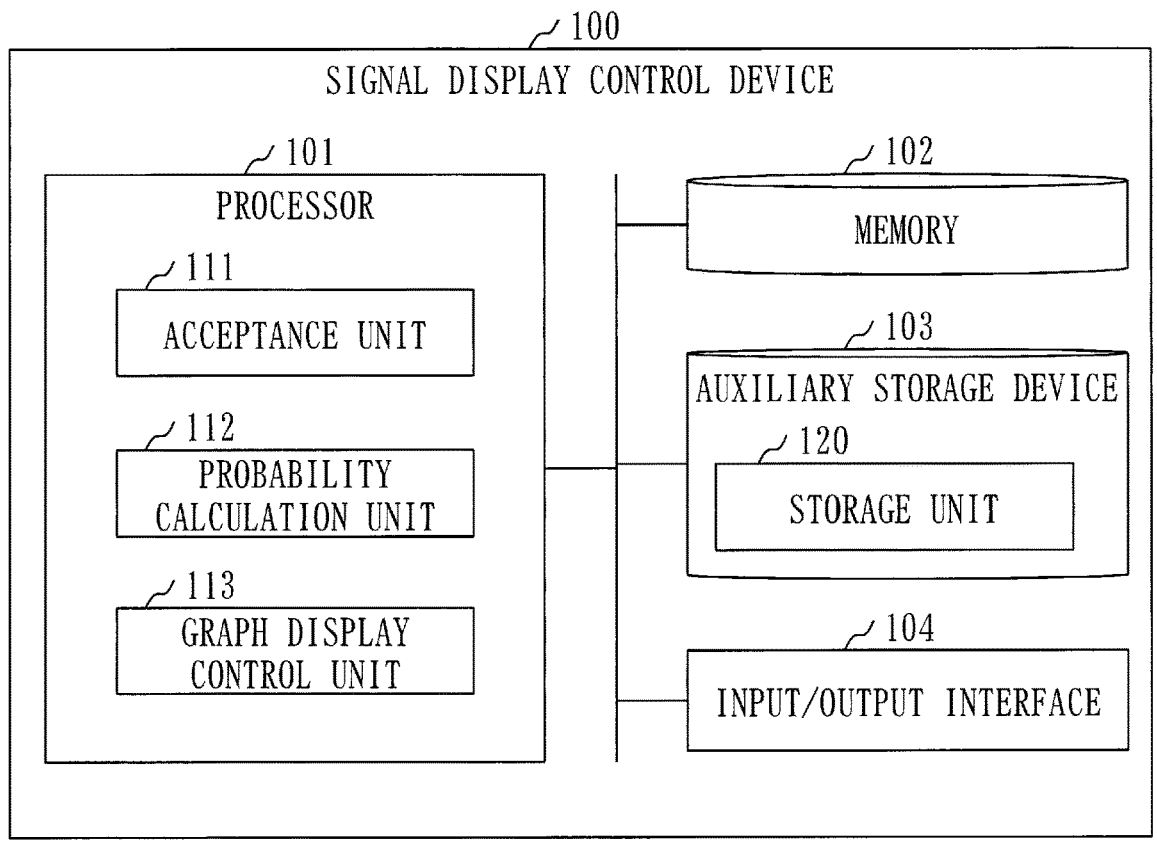
FIG. 2 is a configuration diagram of a signal display control device 100 in Embodiment 1.

A configuration of a signal display control device 100 is the same as a counterpart configuration in Embodiment 1 (see FIG. 2).

*Description of Operations*

In a signal display control method, a probability calculation unit 112 selects a reference value per time point based on an observation value at each time point represented by an accepted observation signal 211.

A specific example of the signal display control method will be described with referring to FIG. 13.

In step S211, an acceptance unit 111 accepts the observation signal 211.

Step S211 is the same as step S111 in Embodiment 1.

In step S221, the probability calculation unit 112 selects a reference value at each time point based on an observation value represented by the accepted observation signal 211 at that each time point.

Specifically, the probability calculation unit 112 selects 0 as a reference value for a time point at which the observation value is 0. Also, the probability calculation unit 112 selects 1 as a reference value for a time point at which the observation value is 1.

In step S222, the probability calculation unit 112 calculates an expectation value at each time point based on the reference value at that each time point.

A method of calculating the expectation value is the same as the method in step S121 of Embodiment 1.

In step S231, a graph display control unit 113 detects an unsteady period of the observation signal 211 based on the expectation value at each time point.

Step S231 is the same as step S131 in Embodiment 1.

In step S232, the graph display control unit 113 generates an unsteady-period graph.

Step S232 is the same as step S132 in Embodiment 1.

In step S233, the graph display control unit 113 displays the unsteady-period graph.

Step S233 is the same as step S133 in Embodiment 1.

Figure 14:
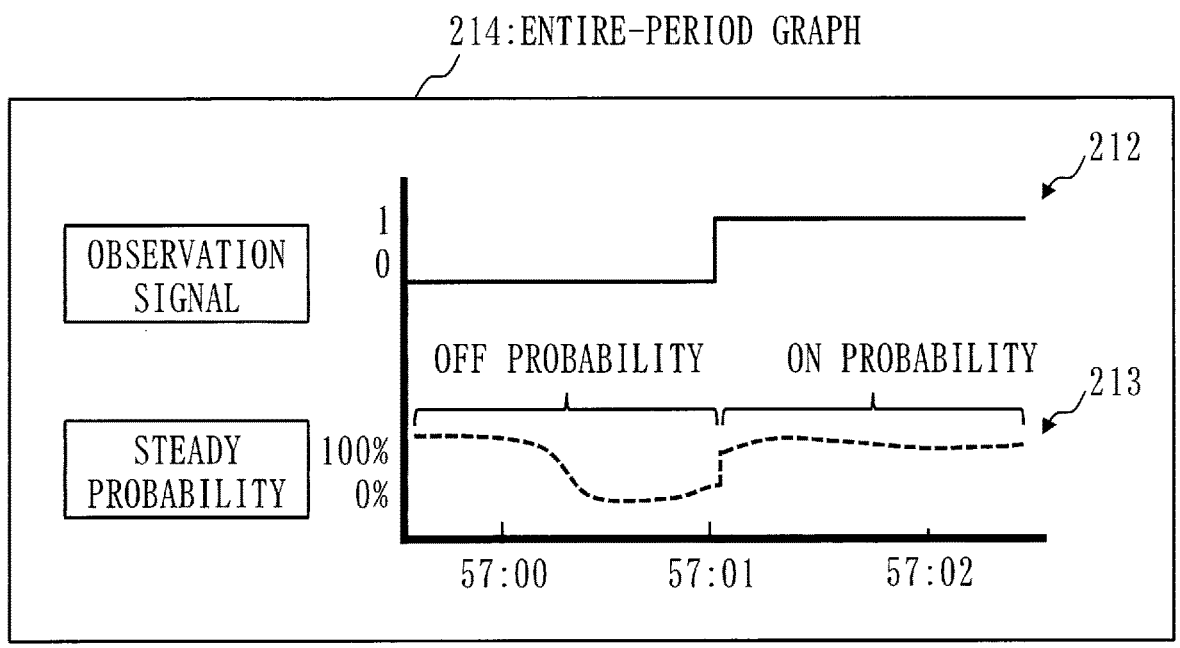
FIG. 14 is a diagram illustrating an entire-period graph 214 in Embodiment 2.

FIG. 14 illustrates an entire-period graph 214.

The entire-period graph 214 contains a signal graph 212 and a probability graph 213.

The signal graph 212 expresses the observation signal in time series.

The probability graph 213 expresses a steady probability at each time point.

The steady probability represents an OFF probability at a time point at which the value of the observation signal is 0, and represents an ON probability at a time point at which the value of the observation signal is 1.

The ON probability is a probability that a normal observation signal represents 1. That is, the reference value is 1.

The OFF probability is a probability that a normal observation signal represents 0. That is, the reference value is 0.

Figure 15:
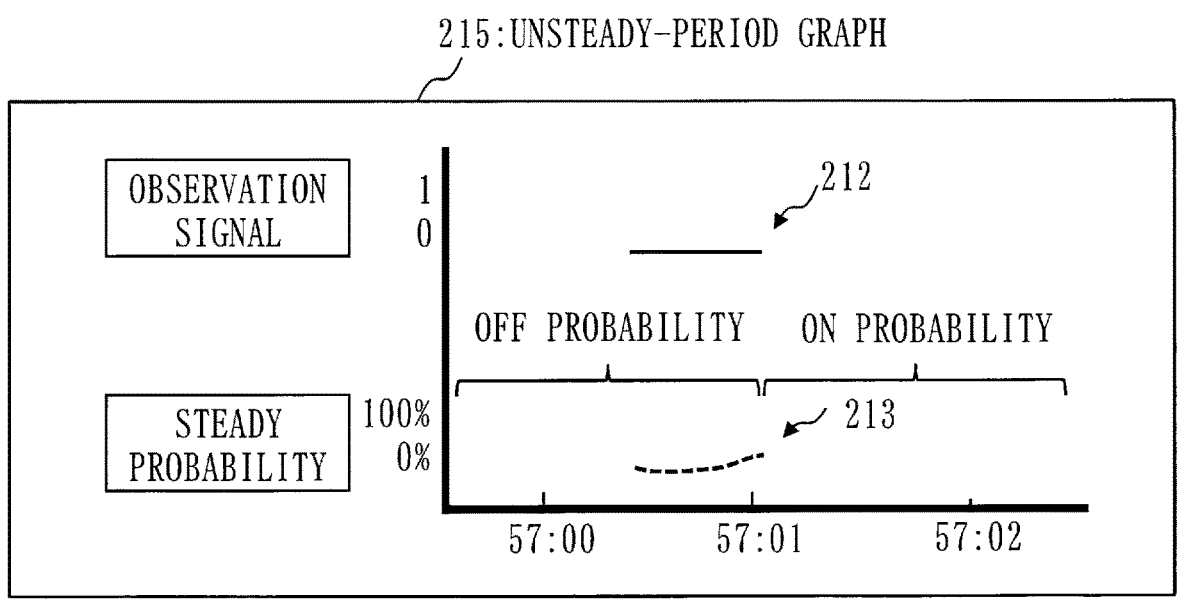
FIG. 15 is a diagram illustrating an unsteady-period graph 215 in Embodiment 2.

FIG. 15 illustrates an unsteady-period graph 215.

In the unsteady-period graph 215, a signal graph 212 expresses that the value of the observation signal in the unsteady period is 0 (OFF). Meanwhile, the probability graph 213 expresses that the value of the normal observation signal is unlikely to be 0 (OFF) in the unsteady period.

*Effect of Embodiment 2*

It is possible to display a probability graph expressing a steady possibility at each time point by changing a reference value according to the value of a binary signal. Thus, the user can determine more easily whether a binary signal is abnormal or normal.

*Other Configurations*

The probability calculation unit 112 may select 1 as a reference value for a time point at which the observation value is 0, and may select 0 as a reference value for a time point at which the observation value is 1.

Figure 16:
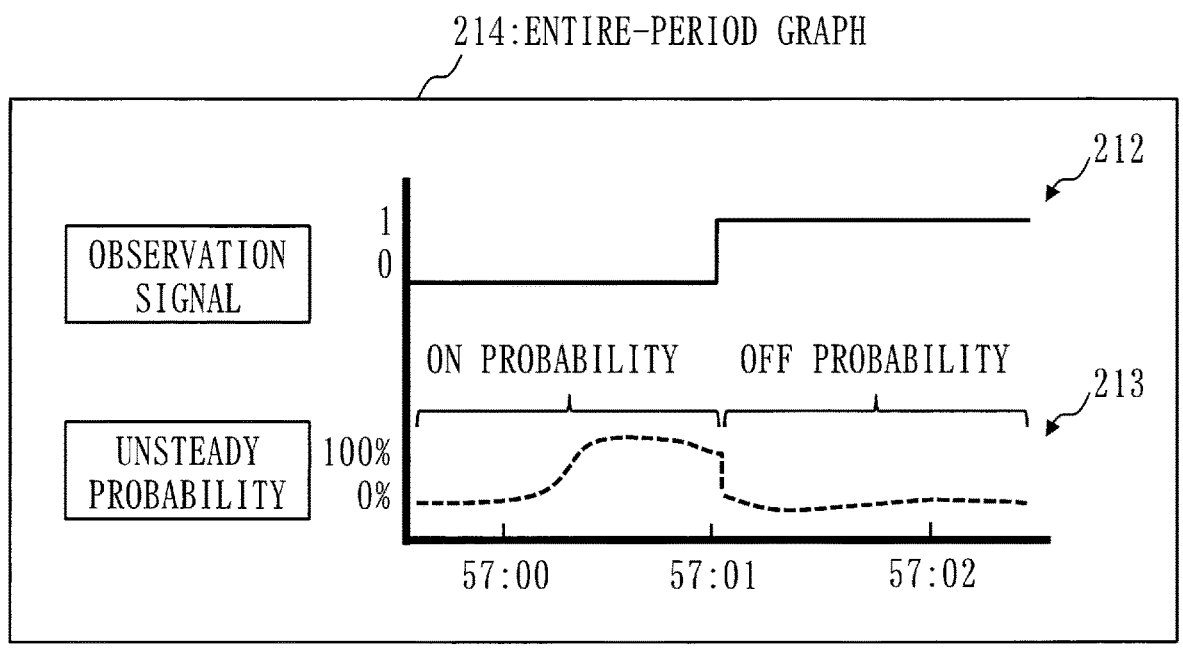
FIG. 16 is a diagram illustrating another example of the entire-period graph 214 in Embodiment 2.

FIG. 16 illustrates an entire-period graph 214.

In the entire-period graph 214 of FIG. 16, a probability graph 213 expresses an unsteady probability at each time point.

Figure 17:
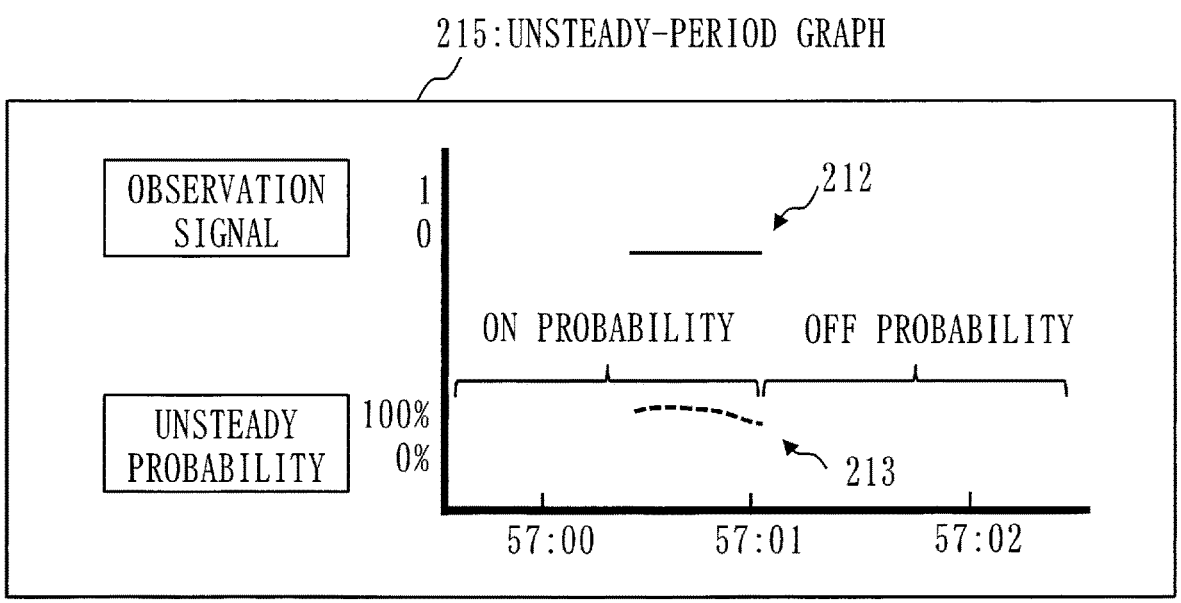
FIG. 17 is a diagram illustrating another example of the unsteady-period graph 215 in Embodiment 2.

FIG. 17 illustrates an unsteady-period graph 215.

In the unsteady-period graph 215 of FIG. 17, the probability graph 213 expresses an unsteady probability in an unstable period.

The unsteady probability represents an ON probability at a time point at which the value of the observation signal is 0, and represents an OFF probability at a time point at which the value of the observation signal is 1.

The graph display control unit 113 may generate the entire-period graph 214 in place of the unsteady-period graph 215, and may display the entire-period graph 214.

The signal display control device 100 may process a plurality of observation signals 211 in place of one observation signal 211 (see FIG. 7 or 8).

The graph display control unit 113 may display the signal graph 212 and the probability graph 213 to be superposed on each other within a common display range (see FIG. 9 or 10).

The graph display control unit 113 may display a coupled graph 216 in place of displaying the signal graph 212 and the probability graph 213 separately (see FIG. 11 or 12).

Embodiment 3

A mode in which a probability graph expresses an entire probability about a plurality of binary signals will be described mainly regarding differences from Embodiments 1 and 2 with referring to FIGS. 18 to 21.

*Description of Configurations*

A configuration of a signal display system 200 is the same as a counterpart configuration in Embodiment 1 (see FIG. 1).

A configuration of a signal display control device 100 is the same as a counterpart configuration in Embodiment 1 (see FIG. 2).

*Description of Operations*

Figure 18:
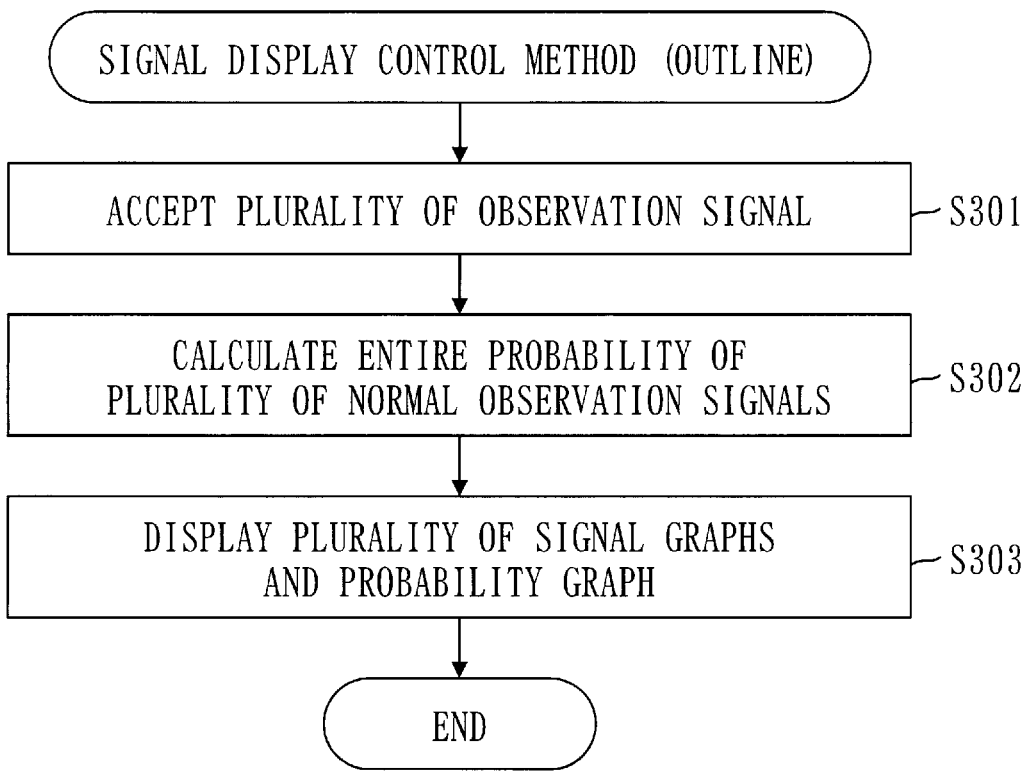
FIG. 18 is a flowchart illustrating a signal display control method (outline) in Embodiment 3.

An outline of a signal display control method will be described with referring to FIG. 18.

In step S301, an acceptance unit 111 accepts a plurality of observation signals 211.

Each observation signal 211 represents an observation value at each time point.

In step S302, a probability calculation unit 112 calculates, per accepted observation signal 211, a probability that a normal observation signal corresponding to the accepted observation signal 211 represents a reference value at each time point.

Then, the probability calculation unit 112 calculates an entire probability about the plurality of normal observation signals based on the probability calculated for an individual normal observation signal.

In step S303, a graph display control unit 113 displays a plurality of signal graphs 212 and a probability graph 213, on a common time axis.

The plurality of signal graphs 212 express the plurality of accepted observation signals in time series.

The probability graph 213 expresses the calculated entire probability in time series.

A specific example of the signal display control method will be described with referring to FIG. 19.

In step S311, the acceptance unit 111 accepts the plurality of observation signals 211.

In step S321, per observation signal 211, the probability calculation unit 112 selects a reference value at each time point based on an observation value represented by the observation signal 211 at that each time point.

A method of selecting the reference value is the same as the method in step S221 of Embodiment 2.

In step S322, per observation signal 211, the probability calculation unit 112 calculates an expectation value at each time point based on the reference value at that each time point.

A method of calculating the expectation value is the same as the method in step S121 of Embodiment 1.

In step S323, the probability calculation unit 112 calculates an entire expectation value at each time point based on the expectation value of the individual observation signal 211 at that each time point.

Specifically, per time point, the probability calculation unit 112 calculates a product of the expectation values of the individual observation signals 211. The product to be calculated is the entire expectation value.

For example, when a first observation signal and a second observation signal are accepted, a product of an expectation value of the first observation signal at a first time point and an expectation value of the second observation signal at the first time point is the entire expectation value at the first time point.

In step S331, the graph display control unit 113 detects an unsteady period of the plurality of observation signals 211 based on the plurality of expectation values of the plurality of observation signals 211 at the individual time points.

For example, the graph display control unit 113 detects an unsteady period of the plurality of observation signals 211 as follows.

First, per observation signal 211, the graph display control unit 113 calculates a negative logarithmic likelihood (−log P) at each time point, as an abnormality degree at that each time point. A method of calculating the negative logarithmic likelihood is the same as the method in step S131 of Embodiment 1.

Subsequently, per time point, the graph display control unit 113 adds up the abnormality degrees of the individual observation signals 211. A sum of the abnormality degrees is called an entire abnormality degree.

Subsequently, the graph display control unit 113 compares an entire abnormality degree at each time point with a threshold. Time points at which the entire abnormality degree exceeds the threshold correspond to the unsteady time points of the plurality of observation signals 211.

Then, the graph display control unit 113 detects the unsteady periods of the plurality of observation signals 211 based on the comparison result of each time point. A period during which the entire abnormality degree exceeds the threshold corresponds to the unsteady periods of the plurality of observation signals 211.

In step S332, the graph display control unit 113 generates an unsteady-period graph.

The unsteady-period graph is a graph containing a signal graph 212 of the unsteady period and a probability graph 213 of the unsteady period.

Specifically, the graph display control unit 113 generates the unsteady-period graph as follows.

First, the graph display control unit 113 generates a plurality of signal graphs 212 of the unsteady periods based on the plurality of observation signals of the unsteady periods.

Furthermore, the graph display control unit 113 generates the probability graph 213 of the unsteady period based on the entire expectation value of the unsteady period at each time point.

Then, the graph display control unit 113 generates a graph in which the plurality of signal graphs 212 of the unsteady period and the probability graph 213 of the unsteady period are juxtaposed. The graph to be generated is the unsteady-period graph.

In step S333, the graph display control unit 113 displays the unsteady-period graph.

Specifically, the graph display control unit 113 inputs data of the unsteady-period graph to a display 202 so as to display the unsteady-period graph to the display 202.

Figure 20:
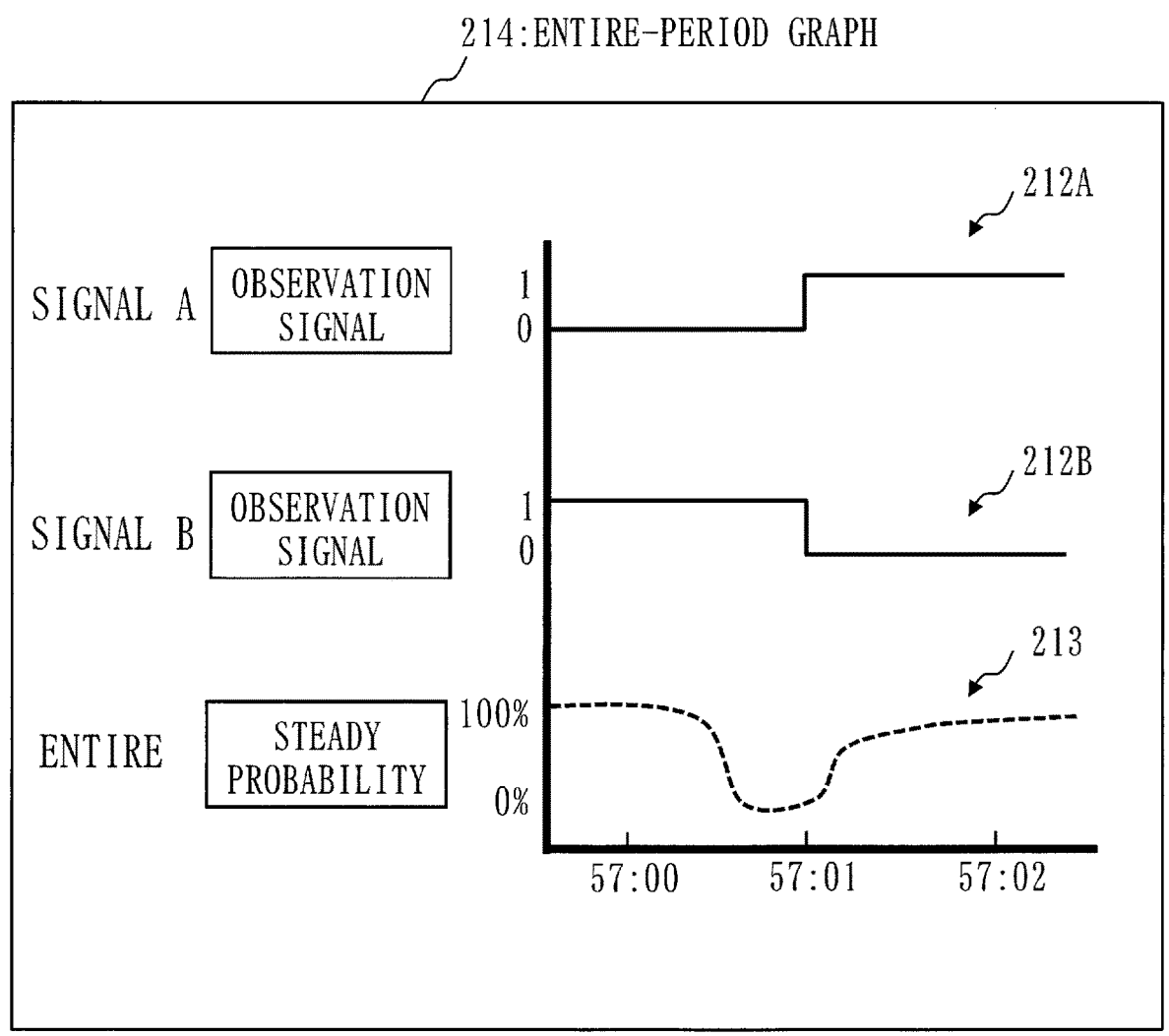
FIG. 20 is a diagram illustrating an entire-period graph 214 in Embodiment 3.

FIG. 20 illustrates an entire-period graph 214.

The entire-period graph 214 contains a signal graph 212A, a signal graph 212B, and a probability graph 213.

The signal graph 212A is a signal graph 212 of a signal A.

The signal graph 212B is a signal graph 212 of a signal B.

The probability graph 213 is an entire steady probability of a steady probability of the signal A and a steady probability of the signal B.

Figure 21:
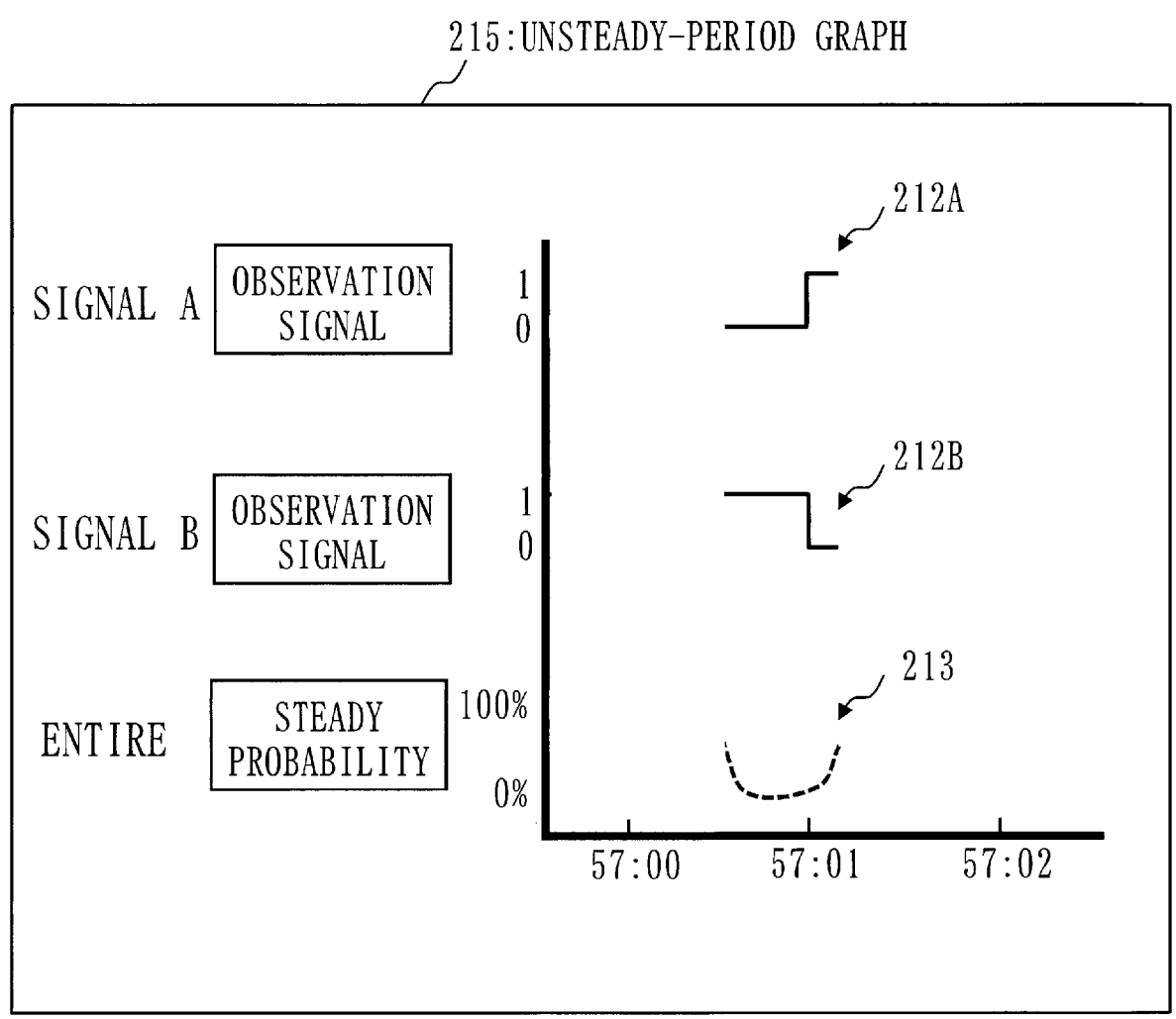
FIG. 21 is a diagram illustrating an unsteady-period graph 215 in Embodiment 3.

FIG. 21 illustrates an unsteady-period graph 215.

The unsteady-period graph 215 contains a signal graph 212A of the unsteady period, a signal graph 212B of the unsteady period, and a probability graph 213 of the unsteady period.

\*\*\* Effect of Embodiment 3\*\*\*

It is possible to display a probability graph expressing an entire steady possibility of a plurality of binary signals. Thus, the user can determine easily whether the plurality of binary signals are abnormal or normal as a whole.

\*\*\*Other Configurations\*\*\*

A type of the entire expectation value may be any one of an ON probability, an OFF probability, a steady probability, and an unsteady probability. That is, the reference value may be one or the other of 1 and 0. The reference value may be a value selected based on an observation value at each time point.

The graph display control unit 113 may generate an entire-period graph 214 in place of the unsteady-period graph 215, and may display the entire-period graph 214.

In addition to the plurality of signal graphs 212 of the plurality of observation signals 211 and the entire probability graph 213 of the plurality of observation signals 211, the graph display control unit 113 may display individual probability graphs 213 of the individual observation signals 211 (see FIG. 7 or 8).

Then, per observation signal 211, the graph display control unit 113 may display the signal graph 212 and the individual probability graph 213 to be superposed on each other within a common display range (see FIG. 9 or 10).

Also, per observation signal 211, the graph display control unit 113 may display a coupled graph 216 in place of displaying the signal graph 212 and the probability graph 213 separately (see FIG. 11 or 12).

Embodiment 4

A mode in which the observation signal is a multi-value signal will be described mainly regarding differences from Embodiments 1 to 3 with referring to FIGS. 22 and 23.

\*\*\*Description of Configurations\*\*\*

A configuration of a signal display system 200 is the same as a counterpart configuration in Embodiment 1 (see FIG. 1).

A configuration of a signal display control device 100 is the same as a counterpart configuration in Embodiment 1 (see FIG. 2).

\*\*\*Description of Operations\*\*\*

In a signal display control method, an acceptance unit 111 accepts a multi-value signal as an observation signal 211.

The multi-value signal represents one of three or more values at each time point. The multi-value signal is also called an analog signal.

A specific example of the signal display control method will be described with referring to FIG. 13.

In step S211, the acceptance unit 111 accepts the observation signal 211. The observation signal 211 is a multi-value signal.

Step S211 is the same as step S111 in Embodiment 1 except that the observation signal 211 is a multi-value signal.

In step S221, a probability calculation unit 112 selects a reference value at each time point based on an observation value represented by the accepted observation signal 211 at that each time point.

Specifically, the probability calculation unit 112 selects, as the reference value at each time point, a value that is the same as the observation value at that each time point.

That is, if the observation value at a first time point is "X", the probability calculation unit 112 selects "X" as the reference value at the first time point. If the observation value at a second time point is "Y", the probability calculation unit 112 selects "Y" as the reference value at the second time point.

In step S222, the probability calculation unit 112 calculates an expectation value at each time point based on the reference value at that each time point.

For example, as the expectation value at each time point, the probability calculation unit 112 calculates an unsteady probability as follows.

Assume that an observation value represented by the observation signal 211 at each time point conforms to a normal distribution.

First, the probability calculation unit 112 calculates an average of the observation value and a standard deviation (a) of the observation value.

Then, the probability calculation unit 112 calculates an outlier degree (% point) of the observation value at each time point based on the average of the observation value and the standard deviation of the observation value. The outlier value to be calculated is an unstable probability.

For example, if the observation value at the first time point is a value deviating from the average by 1σ, the unsteady probability at the first time point is 68%. If the observation value at the second time point is a value deviating from the average by 2σ, the unsteady probability at the second time point is 95%.

For example, as an expectation value at each time point, the probability calculation unit 112 calculates a steady probability as follows.

First, the probability calculation unit 112 calculates the unsteady probability at each time point in accordance with the above method.

Then, the probability calculation unit 112 calculates "1—unsteady probability" of each time point. The value to be calculated is the steady probability.

For example, if the unsteady probability at the first time point is 68%, the steady probability at the first time point is 32%. If the unsteady probability at the second time point is 95%, the steady probability at the second time point is 5%.

In step S231, a graph display control unit 113 calculates an unsteady period of the observation signal 211 based on the expectation value at each time point.

Step S231 is the same as step S131 in Embodiment 1.

In step S232, the graph display control unit 113 generates an unsteady-period graph.

Step S232 is the same as step S132 in Embodiment 1.

In step S233, the graph display control unit 113 displays the unsteady-period graph.

Step S233 is the same as step S133 in Embodiment 1.

Figure 22:
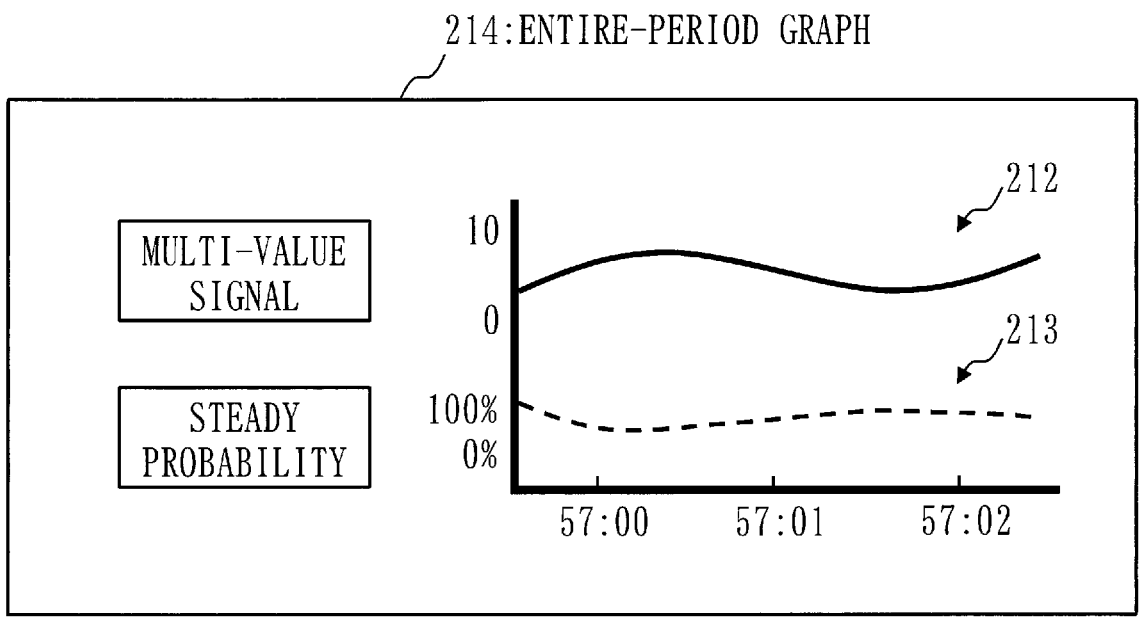
FIG. 22 is a diagram illustrating an entire-period graph 214 in Embodiment 4.

FIG. 22 illustrates an entire-period graph 214.

The entire-period graph 214 contains a signal graph 212 and a probability graph 213.

The signal graph 212 expresses a multi-value signal in time series.

The probability graph 213 expresses a steady probability at each time point of the multi-value signal.

Figure 23:
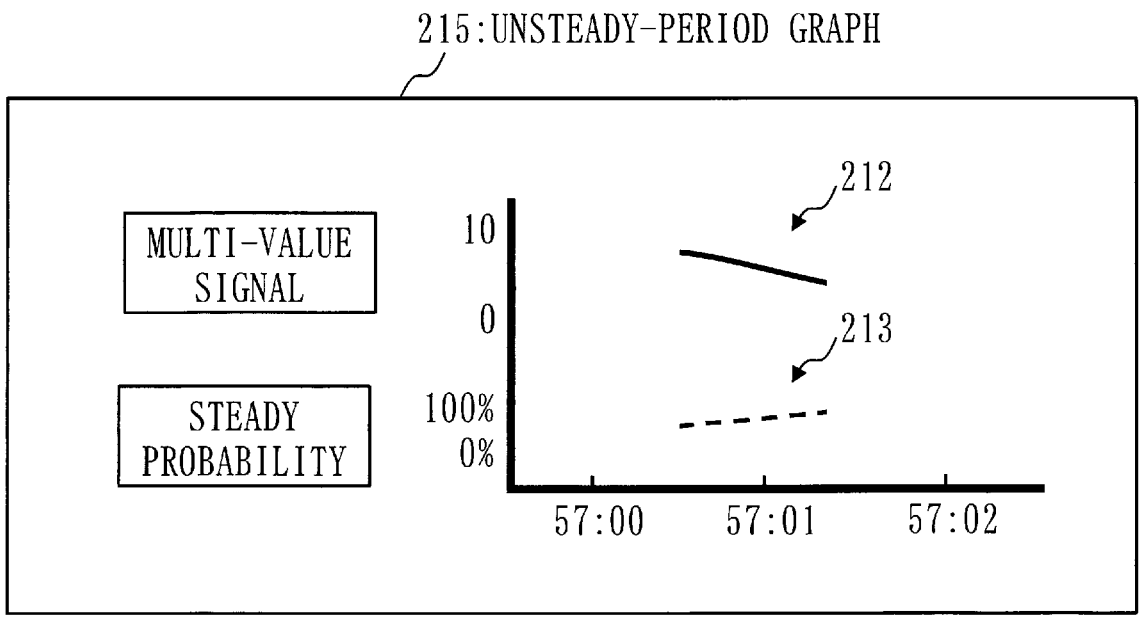
FIG. 23 is a diagram illustrating an unsteady-period graph 215 in Embodiment 4.

FIG. 23 illustrates an unsteady-period graph 215.

The unsteady-period graph 215 contains a signal graph 212 of the unsteady period and a probability graph 213 of the unsteady period.

*Effect of Embodiment 4*

It is possible to display a probability graph even when the observation signal is a multi-value signal. Thus, the user can determine easily whether a multi-value signal is abnormal or normal.

*Other Configurations*

The graph display control unit 113 may generate an entire-period graph 214 in place of the unsteady-period graph 215, and may display the entire-period graph 214.

The signal display control device 100 may process a plurality of observation signals 211 in place of one observation signal 211.

That is, in FIGS. 7 and 8, the signal graph 212 may be a graph of a multi-value signal.

The graph display control unit 113 may display the signal graph 212 and the probability graph 213 to be superposed on each other within a common display range.

That is, in FIGS. 9 and 10, the signal graph 212 may be a graph of a multi-value signal.

The graph display control unit 113 may display a coupled graph 216 in place of displaying the signal graph 212 and the probability graph 213 separately.

That is, in FIGS. 11 and 12, each of the signal A and the signal B may be a multi-value signal.

The graph display control unit 113 may display a probability graph expressing an entire probability about a plurality of multi-value signals.

That is, in FIGS. 20 and 21, each of the signal A and the signal B may be a multi-value signal.

Figure 19:
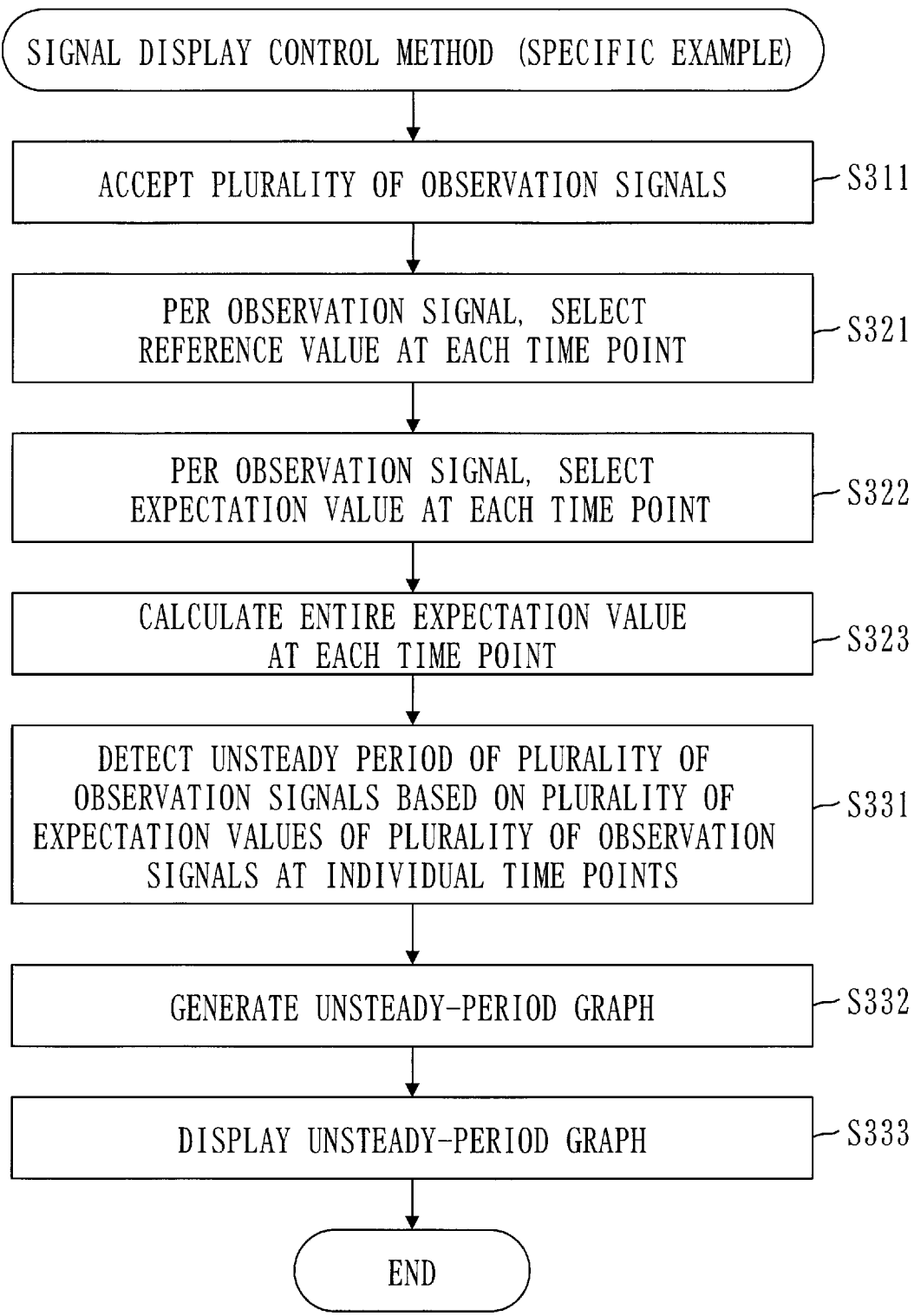
FIG. 19 is a flowchart of the signal display control method (specific example) in Embodiment 3.

A procedure of the signal display control method is the same as the procedure in the signal display control method of FIG. 19.

*Supplement to Embodiments*

Figure 24:
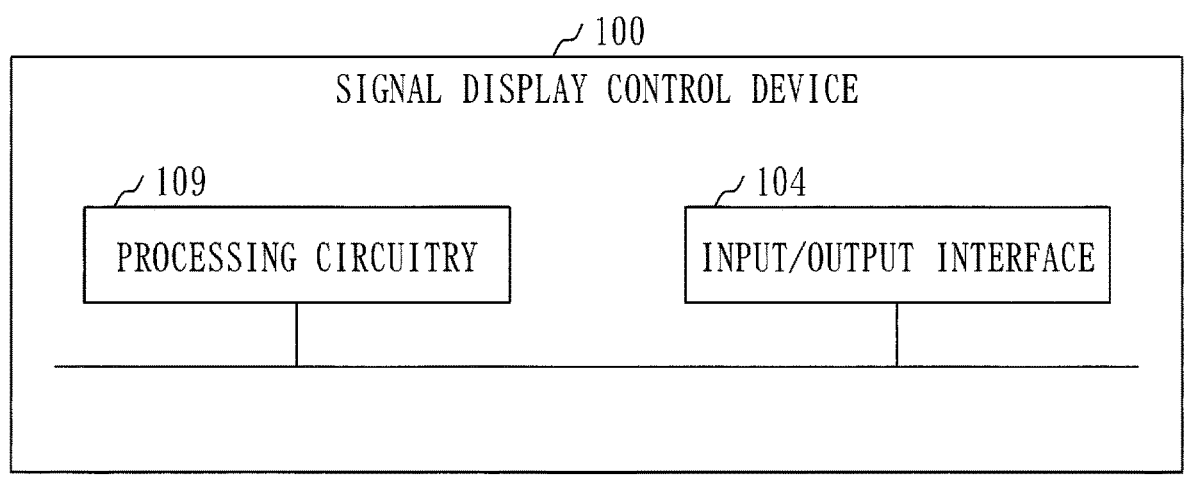
FIG. 24 is a hardware configuration diagram of the signal display control device 100 in individual embodiments.

A hardware configuration of the signal display control device 100 will be described with referring to FIG. 24.

The signal display control device 100 is provided with a processing circuitry 109.

The processing circuitry 109 is hardware that implements the acceptance unit 111, the probability calculation unit 112, and the graph display control unit 113.

The processing circuitry 109 may be dedicated hardware, or may be a processor 101 that implements a program stored in the memory 102.

In a case where the processing circuitry 109 is dedicated hardware, the processing circuitry 109 is, for example, a single circuit, a composite circuit, a programmed processor, a parallel-programmed processor, an ASIC, or an FPGA; or a combination of a single circuit, a composite circuit, a programmed processor, a parallel-programmed processor, an ASIC, and an FPGA.

Note that ASIC stands for Application Specific Integrated Circuit, and FPGA for Field Programmable Gate Array.

The signal display control device 100 may be provided with a plurality of processing circuitries that substitute for the processing circuitry 109. The plurality of processing circuitries share a role of the processing circuitry 109.

In the signal display control device 100, some of the functions may be implemented by dedicated hardware, and the remaining functions may be implemented by software or firmware.

In this manner, the processing circuitry 109 can be implemented by hardware, software, or firmware; or a combination of hardware, software, and firmware.

Each embodiment exemplifies a preferred mode and is not intended to limit a technical scope of the present invention. Each embodiment may be practiced partly, or may be practiced in combination with another embodiment. The procedure described with using flowcharts and so on may be changed as necessary.

REFERENCE SIGNS LIST

100: signal display control device; 101: processor; 102: memory; 103: auxiliary storage device; 104: input/output interface; 109: processing circuitry; 111: acceptance unit; 112: probability calculation unit; 113: graph display control unit; 120: storage unit; 200: signal display system; 201: monitoring target; 202: display; 211: observation signal; 212: signal graph; 213: probability graph; 214: entire-period graph; 215: unsteady-period graph; 216: coupled graph.

The invention claimed is:

1. A signal display control device comprising:
 processing circuitry
 to accept an observation signal representing an observation value at each time point,
 to calculate a probability that a normal observation signal represents a reference value at each time point,
 to display a signal graph indicating the accepted observation signal in time series, and a probability graph expressing the calculated probability in time series, on a common time axis, and
 to determine whether the accepted observation signal at each time point is a normal signal or an abnormal signal based on the displayed signal graph and probability graph, wherein
 use of the probability graph in the determination reduces a difficulty level of determining whether the accepted observation signal is the normal signal or the abnormal signal,
 the observation signal is a binary signal representing 0 or 1 at each time point, and
 the reference value is one or the other of 0 and 1.

2. The signal display control device according to claim 1, wherein the processing circuitry selects the reference value per time point based on the observation value at each time point represented by the accepted observation signal.

3. The signal display control device according to claim 2, wherein the processing circuitry selects 0 as a reference value for a time point at which the observation value is 0, and selects 1 as a reference value for a time point at which the observation value is 1.

4. The signal display control device according to claim 2, wherein the processing circuitry selects 1 as a reference value for a time point at which the observation value is 0, and selects 0 as a reference value for a time point at which the observation value is 1.

5. The signal display control device according to claim 1, wherein the processing circuitry displays the signal graph and the probability graph to be juxtaposed with each other.

6. The signal display control device according to claim 1, wherein the processing circuitry displays the signal graph and the probability graph to be superposed on each other within a common display range.

7. The signal display control device according to claim 1, wherein the processing circuitry displays a coupled graph in which the signal graph and the probability graph are coupled together, and
 wherein the coupled graph has a line graph expressing observation values at individual time points by a line or a curve, and in the line graph, a portion corresponding to each time point is expressed using an appearance corresponding to a probability at that each time point.

8. A signal display control device comprising:
 processing circuitry
 to accept a plurality of observation signals each representing an observation value at each time point,
 to calculate, per accepted observation signal, a probability that a normal observation signal corresponding to the accepted observation signal represents a reference value at each time point, and to calculate an entire probability about a plurality of normal observation signals based on the probability calculated for an individual normal observation signal,
 to display a plurality of signal graphs expressing the plurality of accepted observation signals in time series, and a probability graph expressing the calculated entire probability in time series, on a common time axis, and
 to determine whether each of the plurality of accepted observation signals at each time point is a normal signal or an abnormal signal, based on the displayed plurality of signal graphs and probability graph, wherein
 use of the probability graph in the determination reduces a difficulty level of determining whether each of the plurality of accepted observation signals is the normal signal or the abnormal signal,
 each of the plurality of observation signals is a binary signal representing 0 or 1 at each time point, and
 each reference value is one or the other of 0 and 1.

9. A non-transitory computer readable recording medium recorded with a signal display control program which causes a computer to execute:
 a signal acceptance process of accepting an observation signal representing an observation value at each time point;
 a probability calculation process of calculating a probability that a normal observation signal represents a reference value at each time point;
 a graph display control process of displaying a signal graph expressing the accepted observation signal in time series, and a probability graph expressing the calculated probability in time series, on a common time axis, and
 a graph determination process of determining whether the accepted observation signal at each time point is a normal signal or an abnormal signal based on the displayed signal graph and probability graph, wherein
 use of the probability graph in the graph determination process reduces a difficulty level of determining whether the accepted observation signal is the normal signal or the abnormal signal,
 the observation signal is a binary signal representing 0 or 1 at each time point, and
 the reference value is one or the other of 0 and 1.

10. A non-transitory computer readable recording medium recorded with a signal display control program which causes a computer to execute:
 a signal acceptance process of accepting a plurality of observation signals each representing an observation value at each time point;
 a probability calculation process of calculating, per accepted observation signal, a probability that a normal observation signal corresponding to the accepted observation signal represents a reference value at each time point, and calculating an entire probability about a plurality of normal observation signals based on the probability calculated for an individual normal observation signal;
 a graph display control process of displaying a plurality of signal graphs expressing the plurality of accepted observation signals in time series, and a probability graph expressing the calculated entire probability in time series, on a common time axis; and
 a graph determination process of determining whether each of the plurality of accepted observation signals at each time point is a normal signal or an abnormal signal, based on the displayed plurality of signal graphs and probability graph, wherein use of the probability graph in the graph determination process reduces a difficulty level of determining whether each of the plurality of accepted observation signals is the normal signal or the abnormal signal, each of the plurality of observation signals is a binary signal representing 0 or 1 at each time point, and each reference value is one or the other of 0 and 1.

* * * * *